United States Patent
Mitsumoto et al.

(10) Patent No.: US 10,312,508 B2
(45) Date of Patent: Jun. 4, 2019

(54) LITHIUM METAL COMPOSITE OXIDE POWDER

(71) Applicant: Mitsui Mining & Smelting Co., Ltd., Tokyo (JP)

(72) Inventors: Tetsuya Mitsumoto, Takehara (JP); Daisuke Washida, Takehara (JP); Toshikazu Matsuyama, Takehara (JP); Daisuke Inoue, Takehara (JP); Hideaki Matsushima, Takehara (JP); Yoshimi Hata, Takehara (JP); Hitohiko Ide, Takehara (JP); Shinya Kagei, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 27 days.

(21) Appl. No.: 15/508,184

(22) PCT Filed: Sep. 3, 2015

(86) PCT No.: PCT/JP2015/075068
§ 371 (c)(1),
(2) Date: Mar. 2, 2017

(87) PCT Pub. No.: WO2016/035852
PCT Pub. Date: Mar. 10, 2016

(65) Prior Publication Data
US 2017/0288215 A1    Oct. 5, 2017

(30) Foreign Application Priority Data
Sep. 3, 2014 (JP) ................................ 2014-179540

(51) Int. Cl.
*H01M 4/36* (2006.01)
*H01M 10/05* (2010.01)
(Continued)

(52) U.S. Cl.
CPC ............ *H01M 4/366* (2013.01); *C01G 53/44* (2013.01); *C01G 53/50* (2013.01); *C01G 53/66* (2013.01);
(Continued)

(58) Field of Classification Search
None
See application file for complete search history.

(56) References Cited

U.S. PATENT DOCUMENTS

| | | | |
|---|---|---|---|
| 2013/0119307 A1 | 5/2013 | Watanabe et al. | |
| 2016/0013472 A1* | 1/2016 | Mitsumoto | H01M 4/505 429/231.1 |
| 2016/0380263 A1* | 12/2016 | Nakayama | H01M 4/366 429/223 |

FOREIGN PATENT DOCUMENTS

| | | |
|---|---|---|
| JP | 2001-291518 A | 10/2001 |
| JP | 2002-17253 A | 1/2002 |

(Continued)

*Primary Examiner* — Scott J. Chmielecki
(74) *Attorney, Agent, or Firm* — The Webb Law Firm

(57) ABSTRACT

A positive electrode active material comprising a lithium metal composite oxide having a layered crystal structure provides a novel lithium metal composite oxide powder which can suppress the reaction with an electrolytic solution and raise the charge-discharge cycle ability of a battery, and can improve the output characteristics of a battery. A lithium metal composite oxide powder comprises a particle having a surface portion where one or a combination of two or more ("surface element A") of the group consisting of Al, Ti and Zr is present, on the surface of a particle comprising a lithium metal composite oxide having a layered crystal structure, wherein the amount of surface LiOH is smaller than 0.10% by weight, and the amount of surface $Li_2CO_3$ is smaller than 0.25% by weight; in an X-ray diffraction pattern, the ratio of an integral intensity of the (003) plane of the lithium metal composite oxide to that of the (104)

(Continued)

plane thereof is higher than 1.15; and the amount of S obtained by a measurement using ICP is smaller than 0.10% by weight of the lithium metal composite oxide powder (100% by weight).

15 Claims, 1 Drawing Sheet

(51) Int. Cl.
$H01M\ 4/505$ (2010.01)
$H01M\ 4/525$ (2010.01)
$C01G\ 53/00$ (2006.01)
$H01M\ 10/0525$ (2010.01)
$H01M\ 4/62$ (2006.01)
$H01M\ 4/02$ (2006.01)

(52) U.S. Cl.
CPC ........... $H01M\ 4/505$ (2013.01); $H01M\ 4/525$ (2013.01); $H01M\ 4/62$ (2013.01); $H01M\ 10/0525$ (2013.01); $C01P\ 2002/50$ (2013.01); $C01P\ 2002/60$ (2013.01); $C01P\ 2002/77$ (2013.01); $C01P\ 2004/51$ (2013.01); $C01P\ 2004/62$ (2013.01); $C01P\ 2006/11$ (2013.01); $C01P\ 2006/12$ (2013.01); $C01P\ 2006/40$ (2013.01); $C01P\ 2006/80$ (2013.01); $H01M\ 2004/028$ (2013.01); $H01M\ 2220/20$ (2013.01); $Y02T\ 10/7011$ (2013.01)

(56) References Cited

FOREIGN PATENT DOCUMENTS

| | | |
|---|---|---|
| JP | 2005-310744 A | 11/2005 |
| JP | 2005-322616 A | 11/2005 |
| JP | 2005-346956 A | 12/2005 |
| JP | 2008-153017 A | 7/2008 |
| JP | 2010-086922 A | 4/2010 |
| WO | 2007/142275 A1 | 12/2007 |

* cited by examiner

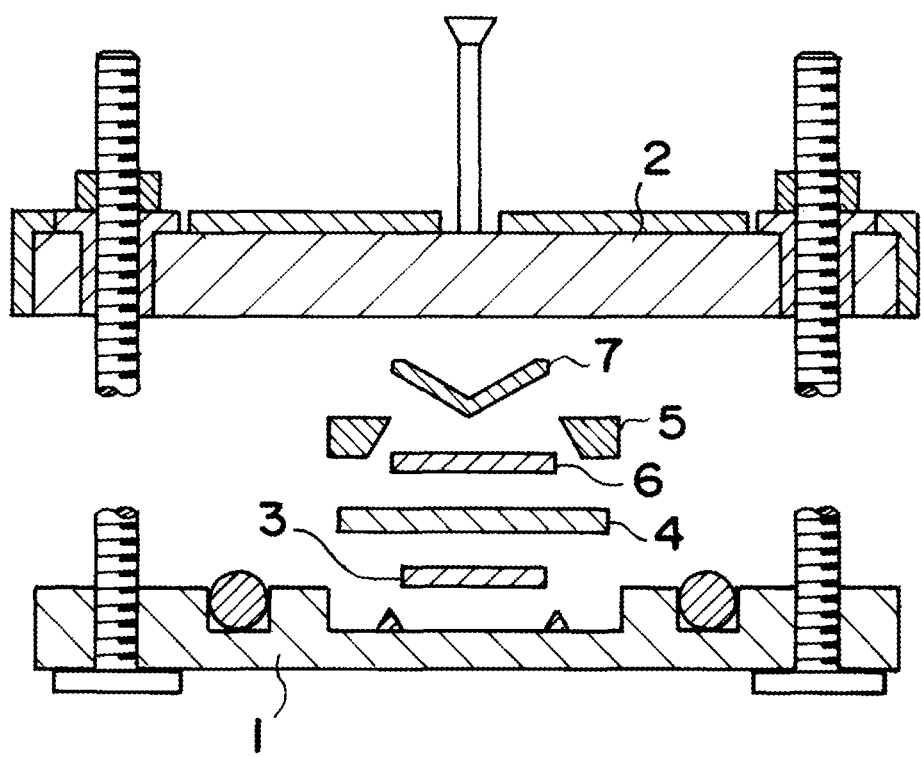

LITHIUM METAL COMPOSITE OXIDE POWDER

CROSS-REFERENCE TO RELATED APPLICATIONS

This application is the U.S. national phase of International Application No. PCT/JP2015/075068 filed Sep. 3, 2015, and claims priority to Japanese Patent Application No. 2014-179540 filed Sep. 3, 2014, the disclosures of which are hereby incorporated in their entirety by reference.

TECHNICAL FIELD

The present invention relates to a lithium metal composite oxide powder which can be used as a positive electrode active material for a lithium secondary battery.

BACKGROUND ART

Lithium batteries, particularly lithium secondary batteries, since they have characteristics of high energy density, long life and the like, are used as power supplies for household appliances such as video cameras, and portable electronic devices such as laptop computers and cellular phones. Recently, the lithium secondary batteries have been applied also to large-size batteries mounted on electric vehicles (EVs), hybrid electric vehicles (HEVs) and the like.

Lithium secondary batteries are secondary batteries having a structure in which in the charge time, lithium dissolves out as ions from a positive electrode and migrates to a negative electrode and is intercalated therein; and in the discharge time, lithium ions reversely return from the negative electrode to the positive electrode, and their high energy density is known to be due to potentials of their positive electrode materials.

As positive electrode active materials of lithium secondary batteries, there are known, in addition to lithium manganese oxide ($LiMn_2O_4$) having a spinel structure, lithium metal composite oxides having a layered crystal structure, such as $LiCoO_2$, $LiNiO_2$ and $LiMnO_2$. Since for example, $LiCoO_2$ has a layered crystal structure in which a lithium atom layer and a cobalt atom layer are alternately stacked through an oxygen atom layer, and is large in charge and discharge capacity and excellent in diffusability of lithium ion intercalation and deintercalation, many of lithium secondary batteries commercially available at present employ lithium metal composite oxides having a layered crystal structure, such as $LiCoO_2$ as positive electrode active materials.

Lithium metal composite oxides having a layered crystal structure, such as $LiCoO_2$ and $LiNiO_2$, are represented by the general formula: $LiMO_2$ (M: transition metal). The crystal structure of these lithium metal composite oxides having a layered crystal structure is assigned to a space group R-3m ("-" is usually attached on the upper part of "3," indicating rotatory inversion. The same applies hereinafter); and their Li ions, Me ions and oxide ions occupy the 3$a$ site, the 3$b$ site and the 6$c$ site, respectively. Then, these lithium metal composite oxides are known to assume a layered crystal structure in which a layer (Li layer) composed of Li ions and a layer (Me layer) composed of Me ions are alternately stacked through an O layer composed of oxide ions.

The case where such a lithium metal composite oxide having a layered crystal structure is used as a positive electrode active material for a lithium secondary battery poses such a problem that since especially when the battery is charged and discharged at a high temperature, the lithium metal composite oxide chemically reacts with an electrolytic solution and changes occur including adhesion of a reaction product of the reaction on a surface of the positive electrode active material, the capacity and the charge-discharge cycle ability of the battery decrease.

As one example of means of solving such a problem, it is considered that the particle surface of a lithium metal composite oxide having a layered crystal structure is coated with a metal or a metal oxide.

For example, Patent Literature 1 (Japanese Patent Laid-Open No. 2001-291518) discloses a positive electrode active material for a lithium secondary battery in which the surface of a lithium metal composite oxide having a layered crystal structure contains an oxide or composite metal oxide layer of a metal(s) selected from the group consisting of Mg, Al, Co, K, Na, Ca, Si, Ti and V.

Patent Literature 2 (Japanese Patent Laid-Open No. 2005-310744) discloses a positive electrode active material obtained by coating with aluminum the surface of a particle obtained by dispersing and stirring a particle powder of a lithium metal composite oxide having a layered crystal structure in an isopropyl alcohol solution and thereafter subjecting the dispersion to a heat treatment at 600° C.

Patent Literature 3 (Japanese Patent Laid-Open No. 2005-322616) discloses a lithium-containing oxide in which the surface of an oxide is coated with a layer including aluminum hydroxide, aluminum oxide and lithium carbonate, the oxide being obtained by adding a lithium metal composite oxide having a layered crystal structure and a powdery metallic aluminum to water to make a slurry, further stirring the slurry to dissolve the metallic aluminum, and thereafter drying the slurry at 80° C.

Patent Literature 4 (Japanese Patent Laid-Open No. 2005-346956) discloses a lithium-containing oxide in which its particle surface is modified with an aluminum compound, wherein the lithium-containing oxide is obtained by adding aluminum stearate to a lithium metal composite oxide having a layered crystal structure, mixing and cracking the mixture by a ball mill, and subjecting the resultant to a heat treatment at 600° C.

Patent Literature 5 (WO2007/142275) discloses a positive electrode active material for a non-aqueous electrolyte secondary battery, as the positive electrode active material in which a lithium metal composite oxide particle having a layered crystal structure is surface-modified so that aluminum in a specific, relatively high concentration is incorporated into its specific surface region, wherein the positive electrode active material is composed of a surface-modified lithium-containing oxide particle in which aluminum is incorporated into the surface layer of the lithium metal composite oxide particle having a layered crystal structure, and the aluminum content within 5 nm of the surface layer is 0.8 or higher in atomic ratio with respect to the total of Ni and elements M.

Patent Literature 6 (Japanese Patent Laid-Open No. 2008-153017) discloses, from the viewpoint of use for a positive electrode active material in which the surface of a lithium oxide having a specific composition and having a specific particle diameter and particle size distribution is coated, the positive electrode active material for a non-aqueous electrolyte secondary battery, which is a lithium metal composite oxide having a layered crystal structure and has a structure in which the surface of a lithium oxide for a non-aqueous electrolyte secondary battery composed of particles having a particle distribution of an average particle diameter D50 of 3 to 15 µm, a minimum particle diameter of 0.5 µm or larger, a maximum particle diameter of 50 µm or smaller, and a D10/D50 of 0.60 to 0.90 and a D10/D90 of 0.30 to 0.70 is coated with a substance A (A is a compound composed of at least one element selected from the group consisting of Ti, Sn, Mg, Zr, Al, Nb and Zn).

CITATION LIST

Patent Literature

[Patent Literature 1]
Japanese Patent Laid-Open No. 2001-291518
[Patent Literature 2]
Japanese Patent Laid-Open No. 2005-310744
[Patent Literature 3]
Japanese Patent Laid-Open No. 2005-322616
[Patent Literature 4]
Japanese Patent Laid-Open No. 2005-346956
[Patent Literature 5]
WO2007/142275
[Patent Literature 6]
Japanese Patent Laid-Open No. 2008-153017

As described above, it is considered that in order to suppress the reaction between an electrolytic solution and a lithium metal composite oxide, the particle surface of the lithium metal composite oxide is subjected to a surface treatment so as to be coated with a metal or a metal oxide. However, it has become clear that when the surface treatment is thus carried out, since impurities such as $SO_4$ and alkali (earth) metals and besides alkali components remain on the particle surface, these become resistance components and reduce the charge and discharge efficiency and the low-temperature output characteristics. Therefore, the impurities and alkali components present on the particle surface need to be reduced.

At this time, in order to reduce the impurities and alkali components present on the particle surface, washing with water is considered. In the case of a lithium metal composite oxide having a layered crystal structure, however, only simply washing with water, hydrogen ions ($H^+$) are caused to mingle on Li sites on the crystal structure outmost surface, and a rock salt layer is made locally on the particle surface after drying, resultantly posing such a problem that the resistance becomes high; an overvoltage is caused in the initial charge time; and the output characteristics decrease.

SUMMARY OF INVENTION

Then, the present invention relates to a positive electrode active material comprising a lithium metal composite oxide having a layered crystal structure, and is to provide a novel lithium metal composite oxide powder which, in the case of being used as a positive electrode active material for a lithium secondary battery, can suppress the reaction with an electrolytic solution and raise the charge-discharge cycle ability of the battery, and reduces impurities and alkali components present on the particle surface and yet suppresses the local formation of a rock salt layer on the particle surface to enable the low-temperature output characteristics to be maintained or improved while the charge and discharge efficiency is maintained.

The present invention proposes a lithium metal composite oxide powder comprising a particle having a surface portion where one or a combination of two or more (these are referred to as "surface element A") of the group consisting of Al, Ti and Zr is present on the surface of a particle comprising a lithium metal composite oxide having a layered crystal structure, wherein the amount of surface LiOH measured by the following method is smaller than 0.10% by weight, and the amount of surface $Li_2CO_3$ measured by the following method is smaller than 0.25% by weight;

in an X-ray diffraction pattern obtained by X-ray diffraction using CuKα radiation, the ratio of an integral intensity of the (003) plane of the lithium metal composite oxide to that of the (104) plane thereof is higher than 1.15; and the amount of S obtained by a measurement using an inductively coupled plasma (ICP) atomic emission spectrometer is smaller than 0.10% by weight of the lithium metal composite oxide powder (100% by weight).

(Measuring Method of the Amount of the Surface LiOH and the Amount of the Surface $Li_2CO_3$)

Titration is carried out according to the following procedure by reference to the Winkler method. 10.0 g of a sample is dispersed in 50 ml of ion-exchanged water, immersed therein for 15 min, and thereafter filtered; and the filtrate is titrated with hydrochloric acid. At this time, by using phenolphthalein and bromophenol blue as indicators, the amount of the surface LiOH and the amount of the surface $Li_2CO_3$ are calculated based on the discoloration of the filtrate and the amount of titration at this time.

In the case where the positive electrode active material the present invention proposes is used as a positive electrode active material for a lithium secondary battery, the reaction with an electrolytic solution can be suppressed and the charge-discharge cycle ability can be improved.

Further since impurities and alkali components, which become resistance components, present on the particle surface are reduced, the decrease of the charge and discharge efficiency can also be suppressed. Nevertheless, moreover since the local formation of a rock salt layer on the particle surface can be suppressed, the low-temperature output characteristics can be maintained or improved.

Therefore, the positive electrode active material the present invention proposes is especially excellent as a positive electrode active material for especially vehicular batteries, especially batteries mounted on electric vehicles (EVs) and hybrid electric vehicles (HEVs).

BRIEF DESCRIPTION OF DRAWING

FIG. 1 is a view illustrating a constitution of a cell for electrochemical evaluation fabricated in the battery characteristics evaluation in Examples.

DETAILED DESCRIPTION OF THE INVENTION

Hereinafter, embodiments of the present invention will be described. The present invention, however, is not limited to the following embodiments.

<Present Lithium Metal Composite Oxide Powder>

The lithium metal composite oxide powder according to one example of embodiments of the present invention is a lithium metal composite oxide powder (referred to as "present lithium metal composite oxide powder") comprising a particle (referred to as "present particle with the surface portion") having a surface portion where one or a combination of two or more (these are referred to as "surface element A") of the group consisting of Al, Ti and Zr is present on the surface of a particle (referred to as "present lithium metal composite oxide particle") comprising a lithium metal composite oxide having a layered crystal structure.

The present lithium metal composite oxide powder may comprise, in addition to the present particle with the surface portion, other components. However, from the viewpoint of effectively providing characteristics of the present particle with the surface portion, the present particle with the surface portion accounts for preferably 80% by weight or more, more preferably 90% by weight or more, and still more preferably 95% by weight or more (including 100% by weight).

<Present Particle with the Surface Portion>

The present particle with the surface portion is a particle having the surface portion containing the surface element A on the surface of the present lithium metal composite oxide particle.

The present particle with the surface portion may have other layers and other portions as long as having the surface portion.

(The Present Lithium Metal Composite Oxide Particle)

The present lithium metal composite oxide particle is preferably a particle comprising a lithium metal composite oxide having a layered crystal structure and represented by the general formula (1): $Li_{1+x}M_{1-x}O_2$ (wherein M is one or a combination of two or more (these are referred to as "constituent element M") of the group consisting of Mn, Co, Ni, transition elements of from the third group elements to the 11th group elements of the periodic table, and typical elements up to the third period of the periodic table). The present lithium metal composite oxide particle, however, is not limited to a particle comprising a lithium metal composite oxide having such a composition.

In the general formula (1): $Li_{1+x}M_{1-x}O_2$, "1+x" is preferably 1.00 to 1.07, more preferably 1.01 or more and 1.07 or less, still more preferably 1.02 or more and 1.06 or less, and further still more preferably 1.03 or more and 1.05 or less.

"M" in the above formula (1) suffices if being one or a combination of two or more of Mn, Co, Ni, transition elements of from the third group elements to the 11th group elements of the periodic table, and typical elements up to the third period of the periodic table.

Here, examples of the transition elements of from the third group elements to the 11th group elements of the periodic table, and the typical elements up to the third period of the periodic table include Al, V, Fe, Ti, Mg, Cr, Ga, In, Cu, Zn, Nb, Zr, Mo, W, Ta and Re. Therefore, "M" suffices if being one or a combination of two or more of, for example, Mn, Co, Ni, Al, V, Fe, Ti, Mg, Cr, Ga, In, Cu, Zn, Nb, Zr, Mo, W, Ta and Re.

In such a way, "M" may be constituted, for example, of only three elements of Mn, Co and Ni, may contain, in addition to the three elements, one or more of the above other elements, or may have a constitution of another combination.

In the case where "M" of the above formula (1) contains three elements of Mn, Co and Ni, the molar ratio of Mn, Co and Ni contained is preferably Mn:Co:Ni=0.10 to 0.45:0.03 to 0.40:0.30 to 0.75, and more preferably Mn:Co:Ni=0.10 to 0.40:0.03 to 0.40:0.30 to 0.75.

Here, in the above general formula (1), the atomic ratio of the amount of oxygen is stated as "2" for convenience, but is allowed to be more or less unfixed.

The present lithium metal composite oxide particle may contain unavoidable impurities. The present lithium metal composite oxide particle is allowed to contain the unavoidable impurities as long as elements thereof are each contained in 0.17% by weight or less, for example. This is because it is believed that the amount in such a degree scarcely affects characteristics of the present lithium metal composite oxide particle.

(The Surface Portion)

The surface portion is preferably such that one or a combination of two or more (these are referred to as "surface element A") of the group consisting of Al, Ti and Zr is present on the surface of the present lithium metal composite oxide particle.

The "surface portion" mentioned here is characterized in having portions where the concentration of the surface element A is higher than that in the particle inner portion are present on the particle surface.

The thickness of the surface portion is, from the viewpoint of suppressing the reaction with an electrolytic solution and improving the charge-discharge cycle ability, and maintaining or improving the low-temperature output characteristics, preferably 0.1 nm to 100 nm, and more preferably 5 nm or larger and 80 nm or smaller, particularly 60 nm or smaller.

When the above surface portion is present on the surface of the present lithium metal composite oxide particle, and in the case where the present lithium metal composite oxide particle is used as a positive electrode active material for a lithium secondary battery, the reaction with an electrolytic solution can be suppressed and the charge-discharge cycle ability can be improved, and the low-temperature output characteristics can be made equal to or more than that of a conventionally proposed surface-treated lithium metal composite oxide powder. Therefore, the present lithium metal composite oxide powder is suitable for use as a positive electrode active material for a lithium secondary battery, and is especially excellent as a positive electrode active material for especially vehicular batteries, especially batteries mounted on electric vehicles (EVs) and hybrid electric vehicles (HEVs).

Whether or not the surface portion where the surface element A is present is present on the surface of the present lithium metal composite oxide particle can be judged by whether or not the concentration of the surface element A is higher in the particle surface than in the particle inner portion. Specifically, that can be judged, for example, by observing the particle by a scanning transmission electron microscope (STEM) and checking whether or not any peak of the surface element A is observed on the surface portion of the particle.

In the present lithium metal composite oxide particle, it is preferable that the ratio ($C_A/C_M$) of a concentration (at %) (referred to as "$C_A$"; in the case where the surface element A contains two or more elements, the total concentration) of the surface element A to a concentration (at %) (referred to as "$C_M$"; in the case where the constituent element M contains two or more elements, the total concentration) of the constituent element M is higher than 0 and lower than 0.8, as measured by X-ray photoelectron spectroscopy (XPS). Here, in the present lithium metal composite oxide particle, $C_M>0$.

When the surface element A is present such that the ratio ($C_A/C_M$) becomes lower than 0.8, the reaction with an electrolytic solution can be suppressed and the charge-discharge cycle ability can be improved. Further the low-temperature output characteristics can be made equal to or more than that of a conventionally proposed surface-treated lithium metal composite oxide powder.

From such a viewpoint, the ratio ($C_A/C_M$) is preferably higher than 0 and lower than 0.8, more preferably higher than 0 and 0.6 or lower, and still more preferably higher than 0 and 0.5 or lower, particularly 0.4 or lower.

Further the ratio ($C_A/C_{Ni}$) of a concentration (at %) (referred to as "$C_A$"; in the case where the surface element A contains two or more elements, the total concentration) of the surface element A to a concentration (at %) (referred to as "$C_{Ni}$") of a constituent element Ni is preferably higher than 0 and lower than 1.0, more preferably higher than 0 and 0.6 or lower, and still more preferably higher than 0 and 0.5 or lower, particularly 0.4 or lower, as measured by X-ray photoelectron spectroscopy (XPS). Here, in the present lithium metal composite oxide particle, $C_{Ni}$>0.

When the concentration of Ni is high, especially since the life deterioration at a high voltage becomes large, it is preferable to regulate the ratio ($C_A/C_{Ni}$) in the above manner.

Further the above $C_A$ is preferably higher than 0 at % and lower than 10 at %, more preferably higher than 0.05 at % and 5 at % or lower, still more preferably higher than 0.1 at % and 3 at % or lower, and further still more preferably higher than 0.2 at % and 2 at % or lower.

The above $C_M$ is preferably higher than 0 at % and lower than 50 at %, more preferably higher than 1 at % and 40 at % or lower, still more preferably higher than 3 at % and 30 at % or lower, and further still more preferably higher than 5 at % and 20 at % or lower.

The above $C_{Ni}$ is preferably higher than 0 at % and lower than 25 at %, more preferably higher than 0.5 at % and 20 at % or lower, still more preferably higher than 1 at % and 15 at % or lower, and further still more preferably higher than 2 at % and 10 at % or lower.

Further it is preferable that the concentration (at %) (referred to as "$C_M$"; in the case where the constituent element M contains two or more elements, the total concentration) of the constituent element M is higher than 0 at % and lower than 50 at %; the concentration (at %) (referred to as "$C_A$"; in the case where the surface element A contains two or more elements, the total concentration) of the surface element A is higher than 0 at % and lower than 10 at %; and the concentration (at %) (referred to as "$C_{Ni}$") of the constituent element Ni is higher than 0 at % and lower than 25 at %, as measured by X-ray photoelectron spectroscopy (XPS).

When each concentration is regulated in the above range, the reaction with an electrolytic solution can be suppressed and the charge-discharge cycle ability can be improved, and the low-temperature output characteristics can be made equal to or more than that of a conventionally proposed surface-treated positive electrode active material.

In such a manner, in order to regulate each of $C_A/C_M$, $C_A/C_{Ni}$, $C_M$, $C_{Ni}$ and $C_A$ in the above range, the regulation may be made, for example, by regulation of the amount of the surface element A in a surface treating agent, and regulation thereafter of the heat treatment temperature and heat treatment time, when the present lithium metal composite oxide particle is subjected to a surface treatment. However, the regulation is not limited to this method.

<Crystal Structure>

With respect to the crystal structure of the present lithium metal composite oxide particle, in an X-ray diffraction pattern measured by XRD using CuKα radiation, it is preferable that the ratio (003)/(104) of an integral intensity of the peak originated from the (003) plane to an integral intensity of the peak originated from the (104) plane is higher than 1.15.

When the ratio (003)/(104) is more nearly 1.00, it means that the proportion a rock salt structure accounts for is higher. It was found that when the ratio (003)/(104) was higher than 1.15, the proportion a rock salt structure accounts for became low and the low-temperature output characteristics could be made good.

From such a viewpoint, in the present lithium metal composite oxide powder, the ratio (003)/(104) is preferably higher than 1.15, and more preferably 1.20 or higher.

Here, in order to make the ratio (003)/(104) higher than 1.15, preferable are the regulation of the calcining conditions, the regulation of the amount of a solvent or water in the surface treatment, and the washing with water in the state of having the surface portion where the surface element A is present on the particle surface. However, the method is not limited to such a method.

<Crystallite Size Ratio of the (003) Plane/the (110) Plane>

Further in the present lithium metal composite oxide powder, it is preferable that the ratio of a crystallite size of the (003) plane of the lithium metal composite oxide to that of the (110) plane thereof is higher than 1.0 and lower than 2.5, as calculated by Scherrer's equation using an X-ray diffraction pattern obtained by X-ray diffraction using CuKα1 radiation.

It is presumed that when the ratio of a crystallite size of the (003) plane to that of the (110) plane is more nearly 1.0, the expansion and contraction in storage and release of Li becomes more isotropic. When the ratio of the crystallite size of the (003) plane to that of the (110) plane is lower than 2.5, the anisotropy of the expansion and contraction can be suppressed and the capacity retention rate after the cycle can be maintained more.

From such a viewpoint, the ratio (003)/(110) of the crystallite size of the (003) plane to that of the (110) plane is preferably higher than 1.0 and lower than 2.5, more preferably higher than 1.3 and lower than 2.5, and still more preferably 1.5 or higher and 2.4 or lower.

<Amount of S>

The amount of S of the present lithium metal composite oxide powder, that is, the amount of S obtained by a measurement using an inductively coupled plasma (ICP) atomic emission spectrometer, is preferably smaller than 0.10% by weight of the lithium metal composite oxide powder (100% by weight), more preferably 0.07% by weight or smaller, still more preferably 0.04% by weight or smaller, and further still more preferably 0.02% by weight or smaller.

When the amount of S of the present lithium metal composite oxide powder is large, since the moisture adsorption rate becomes high and the cycle ability deteriorate, the cycle ability can be made good by making the amount of S of the present lithium metal composite oxide powder smaller than 0.10% by weight.

The amount of S in the present lithium metal composite oxide powder is considered to be mainly an amount originated from S contained as an impurity in raw materials, for example, a lithium compound, a manganese compound, a nickel compound and a cobalt compound, when a lithium metal composite oxide powder is fabricated. Therefore, in order to make the amount of S smaller than 0.10% by weight, it is preferable that after the regular calcination, washing with water is carried out in the state of having the surface portion where the surface element A is present on the particle surface. However, the method is not limited to this method.

<Amount of Surface Lithium Impurity>

The amount of the surface lithium impurity in the present lithium metal composite oxide powder is preferably smaller than 0.35% by weight.

When the amount of the surface lithium is smaller than 0.35% by weight, it is preferable because there can be suppressed the reaction in which an unreacted surface lithium impurity reacts with an electrolytic solution and brings on the deterioration of the charge-discharge cycle ability.

From such a viewpoint, the amount of the surface lithium impurity in the present lithium metal composite oxide powder is preferably smaller than 0.35% by weight, more preferably larger than 0% by weight and 0.25% by weight or smaller, and still more preferably 0.05% by weight or larger and smaller than 0.20% by weight.

Here, the surface lithium impurity is considered to be originated from Li not having reacted and remaining in the calcination. Therefore, in order to regulate the amount of the surface lithium in the above range, the Li present as an unreacted substance can be reduced by regulating the raw material mixing conditions and the calcining conditions for the sufficient reaction, regulating the surface treatment conditions and the heat treatment conditions for a further reaction of the unreacted content, and preferably carrying out washing with water in the state of having the surface portion where the surface element A is present on the particle surface, after the regular calcination. However, the method is not limited this process.

<Primary Particle Area/Secondary Particle Area>

In the present lithium metal composite oxide powder, preferably 0.004 to 0.035 is the ratio (referred to as "primary particle area/secondary particle area") of a primary particle area determined by the following measuring method to a secondary particle area determined by the following measuring method from a secondary particle having a size corresponding to D50 (referred to as "D50") according to a volume-based particle size distribution obtained by a measurement by a laser diffraction scattering-type particle size distribution measuring method.

When the primary particle area/secondary particle area is 0.035 or lower, the area of the secondary particle surface contacting with an electrolytic solution is large and storage and release of lithium ions can occur smoothly, and the charge and discharge efficiency of the first cycle can be raised. On the other hand, when the primary particle area/ secondary particle area is 0.004 or higher, the interfaces among the primary particles in the secondary particle can be made few, and as a result, the resistance of the secondary particle inner portion can be made low and the charge and discharge efficiency of the first cycle can be raised. Therefore, when the ratio is in such a range, the initial charge and discharge efficiency can be improved. In the case where D50 is 4 µm or smaller, however, it has been confirmed that such a tendency is different.

From such a viewpoint, the primary particle area/secondary particle area is preferably 0.004 or higher and 0.032 or lower in the above range, and more preferably 0.016 or higher and 0.032 or lower.

In order to regulate the primary particle area/secondary particle area of the present lithium metal composite oxide in the above range, the regulation can be made, if the production method uses, for example, a spray dry method described later, by raising the crushing strength in cracking after the calcination or the heat treatment as compared with conventional technologies to thereby make D50 small and the "primary particle area/secondary particle area" high.

On the other hand, if the production method uses a coprecipitation method described later, the regulation can be made, for example, by lowering the calcination temperature, making small the primary particle size in a coprecipitated powder, calcining in a carbon dioxide gas-containing atmosphere, or otherwise to thereby make small the average particle diameter of the primary particles and make the "primary particle area/secondary particle area" low.

However, the regulation is not limited these regulation methods.

The above "primary particle area" means an area of the surface of a primary particle on an electron microscope photograph. A lithium metal composite oxide powder is observed (for example, a magnification of 1,000 times) using an electron microscope; 5 secondary particles corresponding to D50 are randomly selected; 100 primary particles are randomly selected from the selected 5 secondary particles; the average particle diameter of the primary particles is determined using image analysis software, and is taken as a diameter (µm) and an area is then calculated by spherical approximation and can be determined as a primary particle area (µm$^2$).

Further the above "secondary particle area" means an area of a secondary particle on a plain surface of an electron microscope photograph. For example, a lithium metal composite oxide powder is observed (for example, a magnification of 1,000 times) using an electron microscope; 5 secondary particles having a size corresponding to D50 are randomly selected; in the case where the secondary particles are spherical, the lengths of the intervals between the particle interfaces are taken as diameters (µm) and areas are calculated; in the case where the secondary particles are in indeterminate shapes, areas are calculated by spherical approximation; and the average value of the 5 areas are determined as a secondary particle area (µm$^2$).

Here, in the present invention, the "primary particle" means a particle of a smallest unit constituted of a plurality of crystallites and surrounded by a grain boundary when being observed by SEM (a scanning electron microscope, for example, a magnification of 1,000 to 5,000 times). Therefore, the primary particle contains single crystals and polycrystals.

At this time, the "crystallite" means a largest aggregation which can be regarded as a single crystal, and can be determined by an XRD measurement and the Rietveld analysis.

On the other hand, in the present invention, the "secondary particle" or an "aggregated particle" means a particle made by aggregation of a plurality of the primary particles with parts of their outer peripheries (grain boundaries) being shared, with the particle being isolated from other particles.

<Primary Particle Area>

The primary particle area of the present lithium metal composite oxide powder is not especially limited. The goal thereof is preferably 0.002 µm$^2$ to 13.0 µm$^2$, more preferably 0.007 µm$^2$ or larger and 13.0 µm$^2$ or smaller, and especially preferably 0.01 µm$^2$ to 4.0 µm$^2$.

The primary particle area of the present lithium metal composite oxide powder can be regulated by the selection of raw material crystal states, the calcining conditions and the like. However, the regulation is not limited to such regulation methods.

In order to regulate the primary particle area of the present lithium metal composite oxide powder to 0.002 µm$^2$ to 13.0 µm$^2$, as described later, it is preferable that temporary calcination is carried out in an air atmosphere, an oxygen gas atmosphere, an atmosphere whose oxygen partial pressure is regulated, a carbon dioxide gas-containing atmosphere, or another atmosphere at 500 to 870° C., and regular calcination is carried out therein at 700 to 1,000° C.

<Amount of the Surface LiOH>

In the present lithium metal composite oxide powder, the amount of the surface LiCH measured by the following measuring method is, from the viewpoint of the improvement of the charge and discharge efficiency due to the surface resistance reduction and the improvement of the low-temperature output characteristics, preferably smaller than 0.10% by weight, and more preferably smaller than 0.09% by weight.

<Amount of the Surface $Li_2CO_3$>

In the present lithium metal composite oxide powder, the amount of the surface $Li_2CO_3$ measured by the following measuring method is, from the viewpoint of the improvement of the charge and discharge efficiency due to the surface resistance reduction and the improvement of the low-temperature output characteristics, preferably smaller than 0.25% by weight, more preferably smaller than 0.20% by weight, still more preferably smaller than 0.18% by weight, and especially preferably smaller than 0.16% by weight.

(Measuring Methods of the Amount of the Surface LiOH and the Amount of the Surface $Li_2CO_3$)

Titration is carried out according to the following procedure by reference to the Winkler method. 10.0 g of a sample is dispersed in 50 ml of ion-exchanged water, immersed therein for 15 min, and thereafter filtered; and the filtrate is titrated with hydrochloric acid. At this time, by using phenolphthalein and bromophenol blue as indicators, the amount of the surface LiOH and the amount of the surface $Li_2CO_3$ are calculated based on the discoloration of the filtrate and the amount of titration at this time.

In the present lithium metal composite oxide powder, in order to make the amount of the surface LiOH smaller than 0.10% by weight and the amount of $Li_2CO_3$ smaller than 0.25% by weight, the regulation may be made, for example, by regulation of the surface treatment conditions and the heat treatment conditions, and washing with water in the state of having the surface portion where the surface element A is present on the particle surface. The washing with water in this state can decrease LiOH preferentially to $Li_2CO_3$ due to the difference in the solubility in water. However, the method is not limited to such a method.

<D50>

In the present lithium metal composite oxide powder, the D50 according to a volume-based particle size distribution obtained by a measurement by a laser diffraction scattering-type particle size distribution measuring method is preferably 20 μm or smaller. When the D50 is 20 μm or smaller, the particles can be prevented from precipitating and becoming inhomogeneous during the slurry storage. Further when the D50 of the present lithium metal composite oxide powder is larger than 4 μm, the slurry viscosity can be prevented from rising due to aggregation of the particles.

From such a viewpoint, the D50 of the present lithium metal composite oxide powder is preferably 20 μm or smaller, more preferably smaller than 17 μm, still more preferably smaller than 15 μm, and further still more preferably larger than 4 μm and 13 μm or smaller.

Here, the laser diffraction scattering-type particle size distribution measuring method is a measuring method of calculating a particle diameter by taking an aggregated powder particle as one particle (aggregated particle). The D50 according to a volume-based particle size distribution obtained by a measurement by the measuring method means a 50% volume-cumulative particle diameter, that is, a diameter at a cumulation of 50% from the finer side in a cumulative percentage representation of particle diameter measurement values in terms of volume in a chart of a volume-based particle size distribution.

In order to regulate the D50 of the present lithium metal composite oxide powder in the above range, the D50 regulation is preferably made by regulation of D50 of starting materials, regulation of the calcining temperature and the calcining time, regulation of the cracking conditions after the calcination, regulation of the heat treatment temperature and the heat treatment time, regulation of the cracking conditions after the heat treatment, and the like. However, the regulation is not limited to these regulation methods.

<Specific Surface Area>

In the present lithium metal composite oxide powder, the specific surface area (SSA) is preferably 0.2 to 3 $m^2/g$.

When the specific surface area (SSA) of the present lithium metal composite oxide powder is 0.2 to 3 $m^2/g$, it is preferable because since the reaction field where Li intercalates and deintercalates can be sufficiently secured, the low-temperature output characteristics can be maintained.

From such a viewpoint, the specific surface area (SSA) of the present lithium metal composite oxide powder is preferably 0.2 to 3 $m^2/g$, particularly 2 $m^2/g$ or smaller, more particularly 1.0 $m^2/g$ or smaller, and still more particularly 0.8 $m^2/g$ or smaller.

In order to regulate the specific surface area of the present lithium metal composite oxide powder in the above range, the SSA regulation is preferably made by regulation of D50 of starting materials, regulation of the calcining temperature and the calcining time, regulation of the cracking conditions after the calcination, regulation of the heat treatment temperature and the heat treatment time, regulation of the cracking conditions after the heat treatment, and the like. However, the regulation is not limited to these regulation methods.

<Tap Density>

In the present lithium metal composite oxide powder, the tap density (TD) is preferably 2.0 $g/cm^3$ or higher, more preferably 2.1 $g/cm^3$ or higher, and especially preferably 2.2 $g/cm^3$ or higher.

When the tap density is 2.0 $g/cm^3$ or higher, it is preferable because the packing property can be enhanced.

Here, the tap density can be determined, for example, as a powder packing density by putting 50 g of a sample in a 150-ml glass measuring cylinder, and tapping the measuring cylinder 540 times in a stroke of 60 mm on a shaking specific gravity meter.

In order to regulate the tap density of the present lithium metal composite oxide powder in the above range, the tap density regulation is preferably made by regulation of D50 of starting materials, regulation of the calcining temperature and the calcining time, regulation of the cracking conditions after the calcination, regulation of the heat treatment temperature and the heat treatment time, regulation of the cracking conditions after the heat treatment, and the like. However, the regulation is not limited to these regulation methods.

<Amount of Na>

The amount of Na of the present lithium metal composite oxide powder is preferably smaller than 400 ppm, more preferably 300 ppm or smaller, and still more preferably 200 ppm or smaller. When the amount of Na is made smaller than 400 ppm, the low-temperature output characteristics can be improved.

In order to make the amount of Na smaller than 400 ppm, preferable is washing with water in the state of having the surface portion where the surface element A is present on the particle surface, after the regular calcination. However, the regulation is not limited to this method.

<Amount of K>

The amount of K of the present lithium metal composite oxide powder is preferably smaller than 70 ppm, more preferably 50 ppm or smaller, and still more preferably 20 ppm or smaller. When the amount of K is made smaller than 70 ppm, the low-temperature output characteristics can be improved.

In order to make the amount of K smaller than 70 ppm, preferable is washing with water in the state of having the surface portion where the surface element A is present on the particle surface, after the regular calcination. However, the regulation is not limited to this method.

<Production Method>

Examples of the production method of the present lithium metal composite oxide powder include a production method comprising the steps of: subjecting a particle powder (referred to as "present lithium metal composite oxide particle powder") of the lithium metal composite oxide having a layered crystal structure to a surface treatment using a surface treating agent containing at least one of aluminum, titanium and zirconium (referred to as "surface treatment step); then washing with water the present lithium metal composite oxide particle powder after the surface treatment (referred to as "water washing step"); and then subjecting the present lithium metal composite oxide particle powder to a heat treatment (referred to as "heat treatment step"). However, the production method is not limited to such a production method.

Here, since the production method suffices if comprising the surface treatment step, the water washing step and the heat treatment step, the production method may further comprise other steps. For example, a cracking step may be added after the heat treatment step or the water washing step, and a cracking step and a classification step may be added before the surface treatment step. Further other steps may be added.

Here, there is no intention of limiting the production method of the present lithium metal composite oxide powder to the method described above.

When the surface treatment is carried out as described above, since the surface portion is formed on active portions of the lithium metal composite oxide, in other words, unstable portions thereof, washing with water thereafter can prevent Li from dissolving out from the lithium metal composite oxide and simultaneously cause impurities to dissolve (be reduced). At this time, the reduction of the impurities on the lithium metal composite oxide surface can reduce resistance components on the surface and improve the charge and discharge efficiency and the low-temperature output characteristics. Further not only the washing with water after the surface treatment can prevent Li from dissolving out and can prevent the surface resistance deterioration, but the effect of the surface portion can suppress the reaction with an electrolytic solution and can improve the cycle ability.

(Production Method of the Present Lithium Metal Composite Oxide Particle Powder)

Then, a production method of the present lithium metal composite oxide powder will be described.

However, a lithium metal composite oxide powder procured by being purchased or otherwise is subjected to predetermined treatments and can also be used as the present lithium metal composite oxide powder.

The present lithium metal composite oxide powder can be obtained by weighing and mixing raw materials, for example, a lithium compound, a manganese compound, a nickel compound and a cobalt compound, wet crushing the mixture by a wet crusher or the like, thereafter granulating, then as required, temporarily calcining, thereafter regularly calcining, cracking the resultant under preferable conditions, then as required, subjecting the resultant to a heat treatment and cracking the resultant under preferable conditions, further as required, classifying, thereafter subjecting the resultant to a surface treatment, washing the resultant with water, subjecting the resultant to a heat treatment, then as required, cracking the resultant under preferable conditions, and further as required, classifying the resultant.

As the lithium compound as a raw material, there can be used, for example, lithium hydroxide (including LiOH and LiOH.H$_2$O), lithium carbonate (Li$_2$CO$_3$), lithium nitrate (LiNO$_3$), lithium oxide (Li$_2$O), and besides, fatty acid lithium and lithium halides. Among these, hydroxide salts, carbonate salts and nitrate salts of lithium are preferable. Among these, in order to suppress the enlargement of the crystallite size toward the (003) plane direction, the use of lithium carbonate as the lithium raw material is preferable.

The kind of the manganese compound to be used as a raw material for the present lithium metal composite oxide particle powder is not especially limited. There can be used, for example, manganese carbonate, manganese nitrate, manganese chloride, manganese dioxide, manganese (III) oxide and trimanganese tetraoxide; among these, manganese carbonate and manganese dioxide are preferable. Among these, electrolytic manganese dioxide obtained by an electrolysis method is especially preferable. Further manganese (III) oxide and trimanganese tetraoxide are also usable.

It is more preferable from the viewpoint of the amount of the impurity that as the manganese compound, there is used as a raw material the manganese compound in which the amount of S and the amount of the magnetic substance are reduced by calcination, washing with water, magnetic separation and the like.

The kind of the nickel compound to be used as a raw material for the present lithium metal composite oxide particle powder is also not especially limited; there can be used, for example, nickel carbonate, nickel nitrate, nickel chloride, nickel oxyhydroxide, nickel hydroxide and nickel oxide; and among these, nickel carbonate, nickel hydroxide and nickel oxide are preferable.

The kind of the aluminum compound to be used as a raw material for the present lithium metal composite oxide particle powder is also not especially limited; there can be used, for example, aluminum carbonate, aluminum nitrate, aluminum chloride, aluminum oxyhydroxide, aluminum hydroxide and aluminum oxide; and among these, aluminum carbonate, aluminum hydroxide and aluminum oxide are preferable.

The kind of the cobalt compound to be used as a raw material for the present lithium metal composite oxide particle powder is also not especially limited; there can be used, for example, basic cobalt carbonate, cobalt nitrate, cobalt chloride, cobalt oxyhydroxide, cobalt hydroxide and cobalt oxide; and among these, basic cobalt carbonate, cobalt hydroxide, cobalt oxide and cobalt oxyhydroxide are preferable.

Additionally, hydroxide salts, carbonate salts, nitrate salts and the like of the M element in the above formula (1) can be used as raw materials for the present lithium metal composite oxide particle powder.

A mixing method of raw materials is preferably one in which a liquid medium such as water and a dispersant are added and wet mixed to thereby make a slurry. Then, in the case of employing a spray dry method described later, the obtained slurry is preferably crushed by a wet crusher. However, the crushing may be dry crushing.

In such mixing of the raw materials, in order to enhance the homogeneity in raw material mixing by removing coarse powder of the nickel raw material, it is preferable that in advance before the raw materials are mixed, at least the nickel compound, as required, the nickel compound and the aluminum compound are crushed and classified to regulate such that the maximum particle diameter (Dmax) of the nickel compound becomes preferably 10 µm or smaller, more preferably 5 µm or smaller, and still more preferably 4 µm or smaller.

It is preferable that after the raw materials are mixed, the mixture is granulated as required.

A granulation method may be of a wet type or a dry type as long as the raw materials are not separated and are dispersed in granulated particles, and may be an extruding granulation method, a tumbling granulation method, a fluidized granulation method, a mixing granulation method, a spray drying granulation method, a pressing granulation method, or a flake granulation method using a roll or the like.

At this time, in the case of the wet granulation, sufficient drying before the calcination is needed. A drying method at this time suffices if drying the granulated particles by a well-known drying method such as a spray heat drying method, a hot air drying method, a vacuum drying method or a freeze drying method; and among these, a spray heat drying method is preferable.

The spray heat drying method is carried out preferably by using a heat spray dryer (spray dryer) (in the present description, referred to as "spray drying method").

Here, a coprecipitated powder to be supplied to calcination may be fabricated, for example, by a so-called coprecipitation method (in the present description, referred to as "coprecipitation method"). The coprecipitation method can provide a coprecipitated powder by dissolving raw materials in a solution, and thereafter regulating conditions including pH for precipitation to thereby obtain the coprecipitated powder.

Here, in the spray dry method, it is likely that the powder strength is relatively low and voids are generated among particles. Then, in the case of employing the spray dry method, it is preferable that the cracking strength is raised more as compared with conventional crushing methods, for example, a cracking method by a coarse crusher having a rotation frequency of about 1,000 rpm. It is preferable that the primary particle area/secondary particle area of the present lithium metal composite oxide powder is raised more and regulated in a desired range, as compared with that of a lithium metal composite oxide powder obtained by a conventional usual spray dry method, for example, by raising the cracking strength by carrying out cracking using a high-speed rotary crusher or the like.

On the other hand, in the coprecipitation method, it is likely that the primary particle becomes large and the primary particle area/secondary particle area becomes high. Then, in the case of employing the coprecipitation method, it is preferable that the average particle diameter of the primary particles is made small and the primary particle area/secondary particle area is lowered and regulated in a desired range, by lowering the calcining temperature, shortening the calcining time, making small the primary particle size of the coprecipitated powder, calcining in a carbon dioxide gas-containing atmosphere, and otherwise, as compared with conventional usual coprecipitation methods.

After the granulation as described above, it is preferable that temporary calcination is carried out at 500 to 870° C. as required, and regular calcination is carried out at 700 to 1,000° C. Carrying out the regular calcination with no temporary calcination is allowed.

The temporary calcination can remove gases (for example, $CO_2$) generated from components contained in raw materials. Therefore, for example, in the case where carbonate salts such as lithium carbonate ($Li_2CO_3$), manganese carbonate, nickel carbonate and basic cobalt carbonate are used as raw materials, carrying out temporary calcination is preferable.

Then, when the regular calcination is carried out at a higher temperature than in the temporary calcination, the crystallinity of the particle can be raised and the particle can be regulated in a desired particle diameter.

It is preferable that the temporary calcination is carried out in a calcining furnace in an air atmosphere, an oxygen gas atmosphere, an atmosphere whose oxygen partial pressure is regulated, a carbon dioxide gas-containing atmosphere, or another atmosphere, by holding its temperature at a temperature of 500° C. to 870° C. (the temperature is that in the case where a material to be calcined in the calcining furnace is brought into contact with a thermocouple), preferably 600° C. or higher and 870° C. or lower, more preferably 650° C. or higher and 770° C. or lower, for 0.5 hours to 30 hours.

The kind of the calcining furnace is not especially limited. The calcination can be carried out, for example, by using a rotary kiln, a stationary furnace or another calcining furnace.

It is preferable that the regular calcination is carried out in a calcining furnace in an air atmosphere, an oxygen gas atmosphere, an atmosphere whose oxygen partial pressure is regulated, a carbon dioxide gas-containing atmosphere, or another atmosphere, by holding its temperature at a temperature of 700 to 1,000° C. (the temperature is that in the case where a material to be calcined in the calcining furnace is brought into contact with a thermocouple), preferably 750° C. or higher and 950° C. or lower, more preferably 800° C. or higher and 950° C. or lower, still more preferably 830° C. or higher and 910° C. or lower, for 0.5 hours to 30 hours. At this time, the calcination conditions are preferably selected such that a material to be calcined containing a plurality of metal elements can be regarded as a single phase of a lithium metal composite oxide having a target composition.

The kind of the calcining furnace is not especially limited. The calcination can be carried out, for example, by using a rotary kiln, a stationary furnace or another calcining furnace.

In the case where the regular calcination with no temporary calcination is carried out, it is preferable that the regular calcination is carried out by holding the temperature at 700 to 1,000° C., preferably 750° C. or higher and 950° C. or lower, more preferably 800° C. or higher and 950° C. or lower, still more preferably 830° C. or higher and 910° C. or lower, for 0.5 hours to 30 hours.

It is preferable that the heat treatment after the calcination in order to obtain the present lithium metal composite oxide powder is carried out, in the case where the regulation of the crystal structure is needed. With respect to the heat treatment atmosphere at this time, the heat treatment is preferably carried out under the condition of an oxidative atmosphere such as an air atmosphere, an oxygen gas atmosphere or an atmosphere whose oxygen partial pressure is regulated.

The cracking after the regular calcination or the heat treatment is preferably carried out by using a high-speed rotary crusher or the like. When the cracking is carried out by a high-speed rotary crusher, aggregation of particles and weakly sintered portions can be cracked, and moreover, strains can be prevented from being generated in particles. It is not, however, that cracking mean is limited to a high-speed rotary crusher.

One example of the high-speed rotary crusher includes a pin mill. The pin mill is known as a disk rotary crusher, which is a cracking machine of such a system that rotation of a rotary disk with pins causes the interior pressure to be reduced and a powder to be sucked in from the raw material feed port. Hence, whereas finer particles are easily carried on the air stream because of their light weight, and pass through the clearance in the pin mill, coarse particles are securely cracked. Hence, cracking with use of a pin mill enables the aggregation of particles and weakly sintered portions to be securely cracked and also can prevent strains from being generated in particles.

The rotation frequency of the high-speed rotary crusher is made to be 4,000 rpm or higher, especially 5,000 to 12,000 rpm, and more preferably 7,000 to 10,000 rpm.

The classification after the regular calcination, because of having a technical significance of regulation of the particle size distribution of an aggregated powder and removal of foreign matter, is preferably carried out by selecting a sieve having a preferable sieve opening.

(Surface Treatment Step)

A method for subjecting the present lithium metal composite oxide particle powder produced as in the above can be carried out by bringing the present lithium metal composite oxide powder obtained as in the above into contact with a surface treating agent containing at least one of aluminum, titanium and zirconium.

Examples of the method of carrying out the surface treatment include a method in which a surface treating agent of an organometallic compound containing at least one of aluminum, titanium and zirconium, such as a titanium coupling agent, an aluminum coupling agent, a zirconium coupling agent, a titanium-aluminum coupling agent, titanium-zirconium coupling agent, an aluminum-zirconium coupling agent or a titanium-aluminum-zirconium coupling agent, is dispersed in an organic solvent to thereby fabricate a dispersion, and the dispersion is brought into contact with the present lithium metal composite oxide particle powder obtained as in the above.

Examples of the surface treating agent include compounds having an organic functional group and a hydrolyzable group in their molecule. Among these, preferable are the compounds having phosphorus (P) on their side chains. A coupling agent having phosphorus (P) on its side chains, because of being good in affinity for a binder, is especially excellent in binding property with the binder.

In the surface treatment step, preferably about 0.1 to 20% by weight of the surface treating agent is brought into contact with 100% by weight of the lithium metal composite oxide powder; and more preferably 0.5% by weight or higher and 10% by weight or lower, still more preferably 1% by weight or higher and 5% by weight or lower, and further still more preferably 1% by weight or higher and 3% by weight or lower of the surface treating agent is brought into contact with the present lithium metal composite oxide powder.

More specifically, it is preferable that the present lithium metal composite oxide powder and the surface treating agent are brought into contact, for example, such that the proportion {(M/lithium metal composite oxide powder)×100, (M:Al, Ti, Zr)} of a total molar number of aluminum, titanium and zirconium in the surface treating agent to a molar number of the present lithium metal composite oxide powder becomes 0.005 to 4%, preferably 0.04% or higher and 2% or lower, more preferably 0.08% or higher and 1% or lower, and especially preferably 0.08% or higher and 0.6% or lower.

Further, it is preferable that the lithium metal composite oxide powder and the surface treating agent are brought into contact such that the proportion {(M/Ni)×100, (M:Al, Ti, Zr)} of a total molar number of aluminum, titanium and zirconium in the surface treating agent to a molar number of nickel in the present lithium metal composite oxide powder becomes 0.01 to 13%, preferably 0.05% or higher and 7% or lower, more preferably 0.1% or higher and 3.5% or lower, and especially preferably 0.1% or higher and 2% or lower.

When the content of Ni is high, since the life deterioration at a relatively high voltage becomes large, it is preferable that the total amount of aluminum, titanium and zirconium in the surface treating agent is regulated by a ratio thereof to the amount of Ni contained.

With respect to the amount of a dispersion in which the surface treating agent is dispersed in an organic solvent or water, it is preferable that the amount of the dispersion is regulated, with respect to 100% by weight of the present lithium metal composite oxide powder, in 0.2 to 20% by weight, preferably 1% by weight or larger and 15% by weight or smaller, more preferably 2% by weight or larger and 10% by weight or smaller, and still more preferably 2% by weight or larger and 7% by weight or smaller; and the dispersion thus regulated is brought into contact with the present lithium metal composite oxide powder.

In the case of the lithium metal composite oxide having a layered crystal structure, when the amount of an organic solvent or water to be contacted is large, since lithium in the layered crystal structure dissolves out, it is preferable that the amount of the surface treating agent or the amount of the dispersion in which the surface treating agent is dispersed in the organic solvent or water is limited as described above.

Further when a small amount of the surface treating agent or the dispersion in which the surface treating agent is dispersed in the organic solvent or water is thus brought into contact with the lithium metal composite oxide powder, the surface treating agent can be brought into contact with the lithium metal composite oxide powder while being mixed with air or oxygen. It can be presumed that since oxygen can thereby be made to remain on the particle surface, it can contribute to the supply of oxygen to be consumed in the oxidation reaction of an organic substance in the later heat treatment.

At this time, it is preferable that not that the above amount of the surface treating agent or the dispersion in which the surface treating agent is dispersed in the organic solvent is at one time brought into contact and mixed with the lithium metal composite oxide powder, but the contacting and mixing treatment is divided in some times and repeated.

Additionally, a dry-type treatment utilizing an inorganic compound powder as a surface treating agent is also possible. The inorganic compound powder is preferably a metal hydroxide such as aluminum hydroxide. In the case of using an inorganic compound powder, however, it is preferable that the ratio ($C_A/C_M$) of a concentration (at %) (in the case where the surface element A contains two or more elements, the total concentration) of the surface element A to a concentration (at %) (in the case where the constituent element M contains two or more elements, the total concentration) of the constituent element M as measured by XPS, the thickness of the surface portion, and the like are controlled to thereby regulate the conditions so as not to increase resistance components.

(Adhesion Treatment of the Surface Portion)

In the case where the surface treatment is carried out using a surface treating agent as described above, it is preferable that after the lithium metal composite oxide powder is heated and dried, for example, to 40 to 120° C. in order to evaporate the organic solvent or water, the lithium metal composite oxide powder is subjected to a heat treatment of a following step. Depending on the kind of the surface treating agent, the adhesion treatment is preferably carried out at 120° C. or higher and lower than 950° C.

(Water Washing Step)

Then, it is preferable that the heat-treated present lithium metal composite oxide particle powder is washed with water (referred to as "water washing").

Water to be used in water washing may be city water, but there is preferably used ion-exchanged water or deionized water having been passed through a filter or a wet magnetic separator.

The pH of the water is preferably 5 to 9.

With respect to the water temperature in the water washing, since when the water temperature in the water washing is high, Li ions dissolve out, the water temperature in the water washing is, from such a viewpoint, preferably 5 to 70° C., particularly 60° C. or lower, more particularly 45° C. or lower, and still more particularly 30° C. or lower.

The amount of water to be brought into contact with the present lithium metal composite oxide is regulated such that the mass ratio (referred to also as "slurry concentration") of the present lithium metal composite oxide powder to the water becomes 10 to 70% by weight, more preferably 20% by weight or higher and 60% by weight or lower, and still more preferably 30% by weight or higher and 50% by weight or lower. When the slurry concentration is 10% by weight or higher, impurities such as S can easily be dissolved out; and conversely when the slurry concentration is 70% by weight or lower, the washing effect corresponding to the amount of water can be attained.

(Heat Treatment)

After washing with water is carried out as described above, the heat treatment is preferably carried out.

In the heat treatment step, it is preferable that the lithium metal composite oxide powder is subjected to the heat treatment in an atmosphere of oxygen of a concentration of 20 to 100% so as to hold a temperature of 700 to 950° C. (the temperature is that in the case where a material to be calcined in the furnace is brought into contact with a thermocouple, that is, a product temperature) for a predetermined time.

Such a heat treatment can evaporate the organic solvent or water, can decompose side chains of the surface treating agent, and can diffuse aluminum, titanium or zirconium in the surface treating agent from the surface into the deep layer direction, can suppress the reaction with an electrolytic solution and improve the charge-discharge cycle ability, and can make the low-temperature output characteristics equal to or more than that of surface-treated conventional positive electrode active materials.

Further when the heat treatment temperature is made to be a temperature of the regular calcination or lower, it is preferable because the cracking load after the heat treatment can be reduced.

From the viewpoint of more enhancing the effect of such a heat treatment, the treatment atmosphere in the heat treatment step is preferably an oxygen-containing atmosphere. The oxygen-containing atmosphere is preferably an oxygen-containing atmosphere of an oxygen concentration of 20 to 100%, more preferably 30% or higher and 100% or lower, still more preferably 50% or higher and 100% or lower, further still more preferably 60% or higher and 100% or lower, and further still more preferably 80% or higher and 100% or lower.

Further the treatment temperature in the heat treatment step is preferably 700 to 950° C. (the temperature is that in the case where a material to be calcined in the calcining furnace is brought into contact with a thermocouple), more preferably 750° C. or higher and 900° C. or lower, particularly 850° C. or lower, more particularly 800° C. or lower.

Further the treatment time in the heat treatment step is, depending on the treatment temperature, preferably 0.5 to 20 hours, more preferably 1 hour or longer and 10 hours or shorter, and still more preferably 3 hours or longer and 10 hours or shorter.

The kind of the calcining furnace is not especially limited. The calcination can be carried out, for example, by using a rotary kiln, a stationary furnace or another calcining furnace.

(Cracking)

After the above heat treatment step, the lithium metal composite oxide powder may be cracked.

At this time, it is preferable that the lithium metal composite oxide powder is cracked in such a cracking strength that the change rate of the specific surface area (SSA) before and after the cracking becomes 100 to 250%.

Since it is desirable that the cracking after the heat treatment is carried out so that fresh surfaces underneath the surface treated layer are not excessively exposed so as to hold the effect of the surface treatment, the cracking is carried out so that the change rate of the specific surface area (SSA) before and after the cracking becomes preferably 100 to 200%, particularly 175% or lower, more particularly 150% or lower, still more particularly 125% or lower.

As one preferable example of such a cracking method, there can be used a cracking apparatus (for example, a pin mill) in which crushing is carried out by pins fixed on a crushing plate rotating at a high speed in a relative direction. In the case where the cracking is carried out in a step after the surface treatment, the cracking is carried out, so as not to shave off the surface portion, preferably at 4,000 to 7,000 rpm, particularly 6,500 rpm or lower, more particularly 6,000 rpm or lower.

After the cracking carried out as in the above, as required, classification may be carried out. The classification at this time, because of having a technical significance of the particle size distribution regulation of an aggregated powder and the removal of foreign matter, is preferably carried out by selecting a sieve having a sieve opening of a preferable size.

<Application>

A positive electrode mixture can be produced by mixing the present lithium metal composite oxide powder, for example, with a conductive material composed of carbon black and the like, and a binder composed of a Teflon® binder and the like. At this time, as required, the present lithium metal composite oxide powder and other positive electrode active materials may be combined and used.

Then, by using such a positive electrode mixture for a positive electrode, using, for example, lithium or a material capable of intercalating and deintercalating lithium, such as carbon, for a negative electrode, and using, for a non-aqueous electrolyte, a solution in which a lithium salt such as lithium hexafluorophosphate ($LiPF_6$) is dissolved in a mixed solvent of ethylene carbonate-dimethyl carbonate or the like, a lithium secondary battery can be constituted. However, battery constitutions are not limited to such a constitution.

Since lithium batteries having the present lithium metal composite oxide powder as at least one positive electrode active material, when being used in repeating charge and discharge, exhibit an excellent charge-discharge cycle ability (cycle ability), the present lithium metal composite oxide powder is especially excellent for an application to a positive electrode active material for lithium batteries used as motor driving power supplies mounted especially on electric vehicles (EVs) and hybrid electric vehicles (HEVs).

Here, the "hybrid vehicles" are vehicles which concurrently use two power sources of an electric motor and an internal combustion engine.

Further the "lithium batteries" means including every battery containing lithium or lithium ions therein, such as lithium primary batteries, lithium secondary batteries, lithium ion secondary batteries and lithium polymer batteries.

<Explanation of Terms>

In the present description, in the case of being expressed as "X to Y" (X and Y are arbitrary numbers), unless otherwise specified, the expression includes a meaning of "X or more and Y or less," and also a meaning of "preferably more than X" and "preferably less than Y."

Further in the case of being expressed as "X or more" (X is an arbitrary number" or "Y or less" (Y is an arbitrary number), the expression includes an intention to the effect of "preferably more than X" or "preferably less than Y."

EXAMPLES

Then, based on Examples and Comparative Example, the present invention will be described further. The present invention, however, is not limited to the following Examples.

Example 1

A polycarboxylate ammonium salt aqueous solution (manufactured by San Nopco Ltd., SN Dispersant 5468) as a dispersant was added to ion-exchanged water. The dispersant was added such that the amount of the dispersant became 6% by weight based on the total amount of a Li raw material, a Ni raw material, a Co raw material, a Mn raw material and the like described later. The dispersant was fully dissolved and mixed in the ion-exchanged water.

Lithium carbonate having a D50 of 7 μm, nickel hydroxide having a D50 of 22 μm, cobalt oxyhydroxide having a D50 of 14 μm, and electrolytic manganese dioxide having a D50 of 23 μm and a specific surface area of 40 m$^2$/g were weighed such that Li:Ni:Co:Mn in molar ratio became 1.05:0.51:0.19:0.26.

The weighed raw materials were mixed and stirred in the above ion-exchanged water containing the dispersant previously dispersed therein to thereby prepare a slurry having a solid content concentration of 50% by weight. The slurry was crushed by a wet crusher at 1,300 rpm for 40 min to thereby make the D50 to be 0.55 μm.

The obtained crushed slurry was granulated and dried by using a heat spray dryer (manufactured by Ohkawara Kakohki Co., Ltd., Spray Dryer OC-16). At this time, the spraying used a rotary disk, and the granulation and drying was carried out at a rotation frequency of 24,000 rpm, at an amount of slurry to be fed of 220 ml/min and by regulating the temperature such that the temperature of the outlet port of the drying tower became 100° C.

The obtained granulated powder was temporarily calcined by using a stationary electric furnace in the air at 700° C.

Then, the obtained temporarily calcined powder was regularly calcined by using a stationary electric furnace at 900° C. for 20 hours.

The fired aggregation obtained by the regular calcination was put in a mortar and cracked with a pestle, and sieved with a sieve opening of 5 mm. The undersize product was cracked by a high-speed rotary crusher (pin mill, manufactured by Makino Mfg. Co., Ltd.) (cracking condition: rotation frequency: 10,000 rpm). Thereafter, the resultant was classified with a sieve having a sieve opening of 53 μm and an undersize lithium metal composite oxide powder was recovered. As a result of a chemical analysis of the obtained lithium metal composite oxide powder (sample), it was $Li_{1.04}Ni_{0.51}Co_{0.19}Mn_{0.26}O_2$.

97.8% by weight of the lithium metal composite oxide powder thus obtained, 1.0% by weight of an aluminum coupling agent (Ajinomoto Fine-Techno Co., Inc., Plenact® AL-M) as a surface treating agent, and 1.2% by weight of isopropyl alcohol as a solvent were mixed by using a cutter mill ("Millser 720G," manufactured by Iwatani Corp.).

The obtained mixed powder was vacuum dried at 80° C. for 1 hour, and thereafter dried in the air at 100° C. for 1 hour.

The obtained dried powder and ion-exchanged water (pH: 5.8, water temperature: 25° C.) were mixed, stirred for 2 min, and washed with water to thereby make a slurry (slurry concentration: 33% by weight). Then, the slurry was filtered, and the obtained cake was dried at 120° C. for 12 hours.

Thereafter, the resultant was sized by using a sieve having a sieve opening of 300 μm; the obtained powder was subjected to a heat treatment in an oxygen-containing atmosphere (oxygen concentration: 94% by volume) at 770° C. for 5 hours to thereby obtain a surface-treated lithium metal composite oxide powder. The obtained powder was sieved with a sieve opening of 5 mm. The undersize product was cracked by a high-speed rotary crusher (pin mill, manufactured by Makino Mfg. Co., Ltd.) (cracking condition: rotation frequency: 6,000 rpm). Thereafter, the resultant was classified with a sieve having a sieve opening of 53 μm to thereby obtain an undersize lithium metal composite oxide powder (sample).

Example 2

A polycarboxylate ammonium salt aqueous solution (manufactured by San Nopco Ltd., SN Dispersant 5468) as a dispersant was added to ion-exchanged water. The dispersant was added such that the amount of the dispersant became 6% by weight based on the total amount of a Li raw material, a Ni raw material, a Co raw material, a Mn raw material and the like described later. The dispersant was fully dissolved and mixed in the ion-exchanged water.

Lithium carbonate having a D50 of 7 μm, nickel hydroxide having a D50 of 22 μm, cobalt oxyhydroxide having a D50 of 14 μm, electrolytic manganese dioxide having a D50 of 23 μm and a specific surface area of 40 m$^2$/g, and aluminum hydroxide having a D50 of 2 μm were weighed such that Li:Ni:Co:Mn:Al in molar ratio became 1.04:0.48:0.20:0.27:0.01.

The weighed raw materials were mixed and stirred in the above ion-exchanged water containing the dispersant previously dispersed therein to thereby prepare a slurry having a solid content concentration of 60% by weight. The slurry was crushed by a wet crusher at 1,300 rpm for 110 min to thereby make the D50 to be 0.45 μm.

The obtained crushed slurry was granulated and dried by using a heat spray dryer (manufactured by Ohkawara Kakohki Co., Ltd., Spray Dryer OC-16). At this time, the spraying used a twin-fluid nozzle, and the granulation and drying was carried out at spray pressure of 0.6 MPa, at an amount of slurry to be fed of 160 ml/min and by regulating the temperature such that the temperature of the outlet port of the drying tower became 110° C.

The obtained granulated powder was temporarily calcined by using a stationary electric furnace in the air at 700° C.

Then, the obtained temporarily calcined powder was regularly calcined by using a stationary electric furnace at 910° C. for 20 hours.

The fired aggregation obtained by the calcination was put in a mortar and cracked with a pestle, and sieved with a sieve opening of 5 mm. The undersize product was cracked by a high-speed rotary crusher (pin mill, manufactured by Makino Mfg. Co., Ltd.) (cracking condition: rotation frequency: 7,000 rpm). Thereafter, the resultant was classified with a sieve having a sieve opening of 53 μm and an undersize lithium metal composite oxide powder was recovered. As a result of a chemical analysis of the obtained lithium metal composite oxide powder (sample), it was $Li_{1.03}Ni_{0.49}Co_{0.20}Mn_{0.27}Al_{0.01}O_2$.

96.7% by weight of the lithium metal composite oxide powder thus obtained, 1.5% by weight of an aluminum coupling agent (Ajinomoto Fine-Techno Co., Inc., Plenact® AL-M) as a surface treating agent, and 1.8% by weight of isopropyl alcohol as a solvent were mixed by using a cutter mill ("Millser 720G," manufactured by Iwatani Corp.). The obtained mixed powder was vacuum dried at 80° C. for 1 hour, and thereafter dried in the air at 100° C. for 1 hour. The obtained dried powder and ion-exchanged water (pH: 5.8, water temperature: 25° C.) were mixed, stirred for 2 min, and washed with water to thereby make a slurry (slurry concentration: 40% by weight). Then, the slurry was filtered and the obtained cake was dried at 120° C. for 12 hours. Thereafter, the resultant was sized by using a sieve having a sieve opening of 300 μm; and the obtained powder was subjected to a heat treatment in an oxygen-containing atmosphere (oxygen concentration: 66% by volume) at 760° C. for 5 hours to thereby obtain a surface-treated lithium metal composite oxide powder. Thereafter, the powder was classified with a sieve having a sieve opening of 53 μm and an undersize lithium metal composite oxide powder (sample) was recovered.

Example 3

A lithium metal composite oxide powder (sample) was produced as in Example 2, except for altering the drying conditions after the surface treatment to vacuum drying at 80° C. for 1 hour and thereafter drying in the air at 350° C. for 1 hour, the slurry concentration in the water washing to 33%, and the heat treatment after the water washing to 800° C.

Example 4

A lithium metal composite oxide powder (sample) was produced as in Example 2, except for weighing lithium carbonate having a D50 of 7 μm, nickel hydroxide having a D50 of 22 μm, cobalt oxyhydroxide having a D50 of 14 μm, electrolytic manganese dioxide having a D50 of 23 μm and a specific surface area of 40 m²/g, and magnesium oxide having a D50 of 3 μm such that Li:Ni:Co:Mn:Mg in molar ratio became 1.046:0.461:0.207:0.285:0.001, and altering the drying conditions after the surface treatment to vacuum drying at 80° C. for 1 hour and thereafter drying in the air at 770° C. for 5 hours, the slurry concentration in the water washing to 30%, and the heat treatment after the water washing to 780° C.

Example 5

A lithium metal composite oxide powder (sample) was produced as in Example 2, except for altering the slurry concentration in the water washing to 50%, and the heat treatment after the water washing to 750° C., carrying out the heat treatment after the water washing in an oxygen-containing atmosphere (oxygen concentration: 21% by volume), and sieving the obtained surface-treated lithium metal composite oxide powder with a sieve opening of 5 mm and cracking the undersize product by a high-speed rotary crusher (pin mill, manufactured by Makino Mfg. Co., Ltd.) (cracking condition: rotation frequency: 5,000 rpm).

Example 6

A polycarboxylate ammonium salt aqueous solution (manufactured by San Nopco Ltd., SN Dispersant 5468) as a dispersant was added to ion-exchanged water. The dispersant was added such that the amount of the dispersant became 6% by weight based on the total amount of a Ni raw material and an Al raw material described later. The dispersant was fully dissolved and mixed in the ion-exchanged water.

Nickel hydroxide having a D50 of 22 μm and aluminum hydroxide having a D50 of 2 μm were mixed and stirred in the above ion-exchanged water containing the dispersant previously dispersed therein to thereby prepare a slurry having a solid content concentration of 40% by weight. The slurry was crushed by a wet crusher at 1,300 rpm for 60 min. To the slurry, lithium carbonate having a D50 of 7 μm, cobalt oxyhydroxide having a D50 of 14 μm, and electrolytic manganese dioxide having a D50 of 23 μm and a specific surface area of 40 m²/g, and the dispersant and ion-exchanged water were added. At this time, the solid content concentration was regulated so as to become 60% and the amount of the dispersant was regulated so as to become 6% by weight of the total amount of the raw materials. Further the raw materials were stirred and mixed such that Li:Ni:Co:Mn:Al in molar ratio became 1.04:0.48:0.20:0.27:0.01.

The obtained slurry was crushed by a wet crusher at 1,300 rpm for 50 min to thereby make the D50 to be 0.46 μm.

The obtained crushed slurry was granulated and dried by using a heat spray dryer (manufactured by Ohkawara Kakohki Co., Ltd., Spray Dryer OC-16). At this time, the spraying used a twin-fluid nozzle, and the granulation and drying was carried out at a spray pressure of 0.6 MPa, at an amount of slurry to be fed of 160 ml/min and by regulating the temperature such that the temperature of the outlet port of the drying tower became 110° C.

The obtained granulated powder was temporarily calcined by using a stationary electric furnace in the air at 700° C.

Then, the obtained temporarily calcined powder was calcined by using a stationary electric furnace at 910° C. for 20 hours.

The fired aggregation obtained by the calcination was put in a mortar and cracked with a pestle, and sieved with a sieve opening of 5 mm. The undersize product was cracked by a high-speed rotary crusher (pin mill, manufactured by Makino Mfg. Co., Ltd.) (cracking condition: rotation frequency: 7,000 rpm). Thereafter, the resultant was classified with a sieve having a sieve opening of 53 μm and an undersize lithium metal composite oxide powder was recovered. As a result of a chemical analysis of the obtained lithium metal composite oxide powder (sample), it was $Li_{1.03}Ni_{0.49}Co_{0.20}Mn_{0.27}Al_{0.01}O_2$.

96.7% by weight of the lithium metal composite oxide powder thus obtained, 1.5% by weight of an aluminum coupling agent (Ajinomoto Fine-Techno Co., Inc., Plenact® AL-M) as a surface treating agent, and 1.8% by weight of isopropyl alcohol as a solvent were mixed by using a cutter mill ("Millser 720G," manufactured by Iwatani Corp.). The obtained mixed powder was vacuum dried at 80° C. for 1 hour, and thereafter dried in the air at 100° C. for 1 hour. The obtained dried powder and ion-exchanged water (pH: 5.8, water temperature: 25° C.) were mixed, stirred for 2 hours, and washed with water to thereby make a slurry (slurry concentration: 33% by weight). Then, the slurry was filtered and the obtained cake was dried at 120° C. for 12 hours. Thereafter, the resultant was sized by using a sieve having a sieve opening of 300 μm; and the obtained powder was subjected to a heat treatment in an oxygen-containing atmosphere (oxygen concentration: 94% by volume) at 770° C. for 5 hours to thereby obtain a surface-treated lithium metal composite oxide powder.

The obtained surface-treated lithium metal composite oxide powder was sieved with a sieve opening of 5 mm. The undersize product was cracked by a high-speed rotary crusher (pin mill, manufactured by Makino Mfg. Co., Ltd.) (cracking condition: rotation frequency: 4,000 rpm). Thereafter, the resultant was classified with a sieve having a sieve opening of 53 μm and an undersize lithium metal composite oxide powder (sample) was recovered.

Example 7

A lithium metal composite oxide powder (sample) was produced as in Example 6, except for altering the surface treatment conditions to that 93.6% by weight of the lithium metal composite oxide powder, 2.8% by weight of an aluminum coupling agent (Ajinomoto Fine-Techno Co., Inc., Plenact® AL-M) as a surface treating agent, and 3.6% by weight of isopropyl alcohol as a solvent were mixed by using a cutter mill ("Millser 720G," manufactured by Iwatani Corp.), and the heat treatment after the water washing to that a heat treatment was carried out in an oxygen-containing atmosphere (oxygen concentration: 94% by volume) at 440° C. for 5 hours; thereafter, the particle sizing was carried out by using a sieve having a sieve opening of 300 μm; and the obtained powder was again subjected to a heat treatment in an oxygen-containing atmosphere (oxygen concentration: 94% by volume) at 770° C. for 5 hours.

Example 8

A lithium metal composite oxide powder (sample) was produced as in Example 1, except for altering the temperature of the temporary calcination to 730° C., altering the surface treatment conditions to that 93.4% by weight of the lithium metal composite oxide powder, 1.9% by weight of a titanium coupling agent (Ajinomoto Fine-Techno Co., Inc., Plenact® KR-46B) as a surface treating agent, and 4.7% by weight of isopropyl alcohol as a solvent were mixed by using a cutter mill ("Millser 720G," manufactured by Iwatani Corp.), and sieving the obtained surface-treated lithium metal composite oxide powder with a sieve opening of 5 mm and cracking the undersize product by a high-speed rotary crusher (pin mill, manufactured by Makino Mfg. Co., Ltd.) (cracking condition: rotation frequency: 4,000 rpm).

Example 9

A lithium metal composite oxide powder (sample) was produced as in Example 1, except for altering the temperature of the temporary calcination to 730° C., and the surface treatment conditions to that 93.4% by weight of the lithium metal composite oxide powder, 2.0% by weight of a zirconium coupling agent (Kenrick Petrochemicals, Inc., Ken-React® NZ® 12) as a surface treating agent, and 4.6% by weight of isopropyl alcohol as a solvent were mixed by using a cutter mill ("Millser 720G," manufactured by Iwatani Corp.), and sieving the obtained surface-treated lithium metal composite oxide powder with a sieve opening of 5 mm and cracking the undersize product by a high-speed rotary crusher (pin mill, manufactured by Makino Mfg. Co., Ltd.) (cracking condition: rotation frequency: 4,000 rpm).

Example 10

A polycarboxylate ammonium salt aqueous solution (manufactured by San Nopco Ltd., SN Dispersant 5468) as a dispersant was added to ion-exchanged water. The dispersant was added such that the amount of the dispersant became 6% by weight based on the total amount of a Li raw material, a Ni raw material, a Co raw material, a Mn raw material and the like described later. The dispersant was fully dissolved and mixed in the ion-exchanged water.

Lithium carbonate having a D50 of 7 μm, nickel hydroxide having a D50 of 22 μm, cobalt oxyhydroxide having a D50 of 14 μm, and electrolytic manganese dioxide having a D50 of 23 μm and a specific surface area of 40 $m^2/g$ were weighed such that Li:Ni:Co:Mn in molar ratio became 1.05:0.51:0.19:0.26.

The weighed raw materials were mixed and stirred in the above ion-exchanged water containing the dispersant previously dispersed therein to thereby prepare a slurry having a solid content concentration of 50% by weight. The slurry was crushed by a wet crusher at 1,300 rpm for 40 min to thereby make the D50 to be 0.55 μm.

The obtained crushed slurry was granulated and dried by using a heat spray dryer (manufactured by Ohkawara Kakohki Co., Ltd., Spray Dryer OC-16). At this time, the spraying used a rotary disk, and the granulation and drying was carried out at a rotation frequency of 24,000 rpm, at an amount of slurry to be fed of 220 ml/min and by regulating the temperature such that the temperature of the outlet port of the drying tower became 100° C.

The obtained granulated powder was temporarily calcined by using a stationary electric furnace in the air at 700° C.

Then, the obtained temporarily calcined powder was regularly calcined by using a stationary electric furnace at 900° C. for 20 hours.

The fired aggregation obtained by the regular calcination was put in a mortar and cracked with a pestle, and sieved with a sieve opening of 5 mm. The undersize product was cracked by a high-speed rotary crusher (pin mill, manufactured by Makino Mfg. Co., Ltd.) (cracking condition: rotation frequency: 10,000 rpm). Thereafter, the resultant was classified with a sieve having a sieve opening of 53 μm and an undersize lithium metal composite oxide powder was recovered.

As a result of a chemical analysis of the obtained lithium metal composite oxide powder (sample), it was $Li_{1.04}Ni_{0.51}Co_{0.19}Mn_{0.26}O_2$.

Then, the surface treatment conditions were made as follows. With 100% by weight of the lithium metal composite oxide powder, 0.15% by weight of aluminum hydroxide (Showa Denko K.K., Higilite® H-43M®) as a surface treating agent was mixed by using a cutter mill ("Millser 720G," manufactured by Iwatani Corp.). The obtained mixed powder and ion-exchanged water (pH: 5.8, water temperature: 25° C.) were mixed, stirred for 2 min, and washed with water to thereby make a slurry (slurry concentration: 33% by weight). Then, the slurry was filtered, and the obtained cake was dried at 120° C. for 12 hours.

Thereafter, the resultant was sized by using a sieve having a sieve opening of 300 μm; the obtained powder was subjected to a heat treatment in an oxygen-containing atmosphere (oxygen concentration: 94% by volume) at 770° C. for 5 hours to thereby obtain a surface-treated lithium metal composite oxide powder. Thereafter, the powder was classified with a sieve having a sieve opening of 53 μm to thereby obtain an undersize lithium metal composite oxide powder (sample).

Comparative Example 1

A polycarboxylate ammonium salt aqueous solution (manufactured by San Nopco Ltd., SN Dispersant 5468) as a dispersant was added to ion-exchanged water. The dispersant was added such that the amount of the dispersant became 6% by weight based on the total amount of a Li raw material, a Ni raw material, a Co raw material, a Mn raw material and the like described later. The dispersant was fully dissolved and mixed in the ion-exchanged water.

Lithium carbonate having a D50 of 7 μm, nickel hydroxide having a D50 of 22 μm, cobalt oxyhydroxide having a D50 of 14 μm, electrolytic manganese dioxide having a D50 of 23 μm and a specific surface area of 40 m²/g, and magnesium oxide having a D50 of 3 μm were weighed such that Li:Ni:Co:Mn:Mg in molar ratio became 1.044:0.512: 0.186:0.257:0.001.

The weighed raw materials were mixed and stirred in the above ion-exchanged water containing the dispersant previously dispersed therein to thereby prepare a slurry having a solid content concentration of 50% by weight. The slurry was crushed by a wet crusher at 1,300 rpm for 80 min to thereby make the D50 to be 0.45 μm.

The obtained crushed slurry was granulated and dried by using a heat spray dryer (manufactured by Ohkawara Kakohki Co., Ltd., Spray Dryer OC-16). At this time, the spraying used a twin-fluid nozzle, and the granulation and drying was carried out at spray pressure of 0.6 MPa, at an amount of slurry to be fed of 160 ml/min and by regulating the temperature such that the temperature of the outlet port of the drying tower became 110° C.

The obtained granulated powder was temporarily calcined by using a stationary electric furnace in the air at 850° C.

Then, the obtained temporarily calcined powder was calcined by using a stationary electric furnace at 910° C. for 20 hours.

The fired aggregation obtained by the calcination was put in a mortar and cracked with a pestle, and classified with a sieve having a sieve opening of 53 μm, and an undersize lithium metal composite oxide powder was recovered.

As a result of a chemical analysis of the obtained lithium metal composite oxide powder (sample), it was $Li_{1.04}Ni_{0.512}Co_{0.186}Mn_{0.257}Mg_{0.001}O_2$.

<Analysis of the Surface Portion>

The cross-section of the particle surface vicinity of the lithium metal composite oxide (sample) was observed by a transmission electron microscope ("JEM-ARM200F," manufactured by JEOL Ltd.), and analyzed by energy dispersive X-ray spectrometry (EDS).

As a result, for each lithium metal composite oxide (sample) obtained in the above Examples, it could be confirmed that portions where an Al element was contained more than in the particle inner portion, that is, the "surface portion," was present on the surface of each particle.

The thickness of the surface portion was measured by carrying out a line analysis on the particle surface portion and taking the length between both ends of the peaks of the Al element as a thickness of the surface portion.

<Analysis by XPS>

The proportions of elements present in the depth direction were analyzed under sputtering by an XPS ("XPS Quantam 2000," manufactured by Ulvac-Phi, Inc.). Here, the concentrations and the ratios of the surface elements and the constituent elements were analyzed as proportions of elements present on the outmost surface of the lithium metal composite oxide (sample).

The instrument specification, the instrument conditions and the like used in the measurement were as follows.

X-ray source: AlKα1 (1,486.8 eV)
Tube voltage: 17 kV
Tube current: 2.35 mA
X-ray irradiation area: 200 μmφ
Measurement condition: state and semi-quantitative narrow measurement
Pass energy: 23.5 eV
Measurement interval: 0.1 eV
Sputtering rate: 1 to 10 nm/min (in terms of SiO2)

The analysis of the XPS data was carried out using data analysis software ("Multipack Ver 6.1A," manufactured by Ulvac-Phi, Inc.). The orbit to be used for the calculation was determined for each element and the analysis was carried out by taking the sensitivity coefficient into consideration.

Ni: 2p3, sensitivity coefficient: 2.309
Co: 2p3, sensitivity coefficient: 2.113
Mn: 2p1, sensitivity coefficient: 0.923
Al: 2p, sensitivity coefficient: 0.256
Ti: 2p, sensitivity coefficient: 2.077
Zr: 3d, sensitivity coefficient: 2.767
C: 1s, sensitivity coefficient: 0.314
O: 1s, sensitivity coefficient: 0.733

The element ratios to be calculated by the above were checked by taking the interference of the Ni LMM peak into consideration and checking with the compositional ratios of the above-mentioned chemical analysis result.

As a result, for each lithium metal composite oxide (sample) obtained in the above Examples, it could be confirmed that the ratio ($C_A/C_M$) of a concentration (in the case where the surface element A contained two or more elements, the total concentration) of the surface element A to a concentration (in the case where the constituent element M contained two or more elements, the total concentration) of the constituent element M was higher than 0 and lower than 0.8.

<Amount of Surface LiOH and Amount of Surface $Li_2CO_3$>

Titration was carried out according to the following procedure by reference to the Winkler method. 10.0 g of a sample was dispersed in 50 ml of ion-exchanged water, immersed therein for 15 min, and thereafter filtered; and the filtrate was titrated with hydrochloric acid. At this time, by using phenolphthalein and bromophenol blue as indicators, the amount of the surface LiOH and the amount of the surface $Li_2CO_3$ were calculated based on the discoloration of the filtrate and the amount of titration at this time.

<Calculation of the Amount of Surface Lithium Impurity>

The amount of the sum of an amount of lithium hydroxide and an amount of lithium carbonate calculated from the above titration was taken as an amount of surface lithium impurity.

<Measurement of the primary particle area>

The primary particle area of each lithium metal composite oxide powder (sample) obtained in the Examples and the Comparative Example was measured as follows. The sample (powder) was observed at a magnification of 1,000 times using a SEM (scanning electron microscope); 5 secondary particles corresponding to D50 were randomly selected; the magnification was changed to 10,000 times and 100 primary particles were randomly selected from the selected 5 secondary particles; the average particle diameter of the primary particles was calculated using image analysis software (MAC-VIEW ver. 4, manufactured by Mountech Co., Ltd.). The average particle diameter of the primary particles was taken as a diameter ($\mu m$) and an area was then calculated by spherical approximation and was determined as a primary particle area ($\mu m^2$).

Here, the primary particle area thus determined was indicated as "primary particle area" in Table 1.

<Measurement of the D50>

For each lithium metal composite oxide powder (sample) obtained in the Examples and the Comparative Example, there was determined the D50 by using an automated sample feed machine ("Microtrac SDC," manufactured by Nikkiso Co., Ltd.) for a laser diffraction particle size distribution analyzer, and charging the lithium metal composite oxide powder (sample) in a water-soluble solvent, irradiating the resultant with a 40-W ultrasonic wave for 360 sec in a flow rate of 40%; thereafter, measuring the particle size distribution by using the laser diffraction particle size distribution analyzer "MT3000II" manufactured by Nikkiso Co., Ltd., and determining D50 from a chart of a volume-based particle size distribution obtained.

Here, the water-soluble solvent in the measurement was passed through a 60-$\mu m$ filter; and with the following conditions: the solvent refractive index was 1.33; the particle transparency condition was transmission; the particle refractive index was 2.46; the shape was taken as nonspherical; the measurement range was 0.133 to 704.0 $\mu m$; and the measuring time was 30 sec, and an average value of two-times measurements was used as D50.

<Measurement of the Secondary Particle Area>

The lithium metal composite oxide powder (sample) was observed at a magnification of 1,000 times using a SEM (scanning electron microscope); 5 secondary particles corresponding to the D50 obtained by the above measurement were randomly selected; in the case where the secondary particles were spherical, the lengths of the intervals between the particle interfaces were taken as a diameter ($\mu m$) and areas were calculated; in the case where the secondary particles were in indeterminate shapes, areas were calculated by spherical approximation; and the average value of the 5 areas were determined as a secondary particle area ($\mu m^2$).

<Measurement of the Specific Surface Area>

0.5 g of the lithium metal composite oxide powder (sample) was weighed and placed in a glass cell for a flow-type gas adsorption specific surface area analyzer MONOSORB LOOP ("product name: MS-18," manufactured by Yuasa Ionics), and was treated in the nitrogen gas atmosphere at 250° C. for 10 min, after the glass cell interior was replaced by nitrogen gas flowing at a gas volume of 30 mL/min for 5 min by using a pre-treatment apparatus for the MONOSORB LOOP. Thereafter, the sample (powder) was measured by one point method for BET by using the MONOSORB LOOP.

Here, as an adsorption gas in the measurement, a mixed gas of 30% of nitrogen and 70% of helium was used.

<Measurement of the Amount of S>

The amount of S of each lithium metal composite oxide powder (sample) obtained in the Examples and the Comparative Example was measured by an inductively coupled plasma (ICP) atomic emission analysis.

<Measurement of the Tap Density>

There was determined the powder packing density when 50 g of the sample (powder) obtained in the Examples and the Comparative Example each was put in a 150-ml glass measuring cylinder; and the measuring cylinder was tapped 540 times in a stroke of 60 mm on a shaking specific gravity meter (KRS-409, manufactured by Kuramochi Kagaku Kikai Seisakusho K.K.).

<X-Ray Diffraction>

The X-ray diffraction measurement for each lithium metal composite oxide obtained in the Examples and the Comparative Example was carried out; and in an obtained X-ray diffraction pattern, there was calculated the ratio (003)/(104) of an integral intensity of the peak originated from the (003) plane to an integral intensity of the peak originated from the (104) plane.

The X-ray diffraction measurement was carried out using an X-ray diffractometer (D8 ADVANCE, manufactured by Bruker AXS K.K.). The instrument specification, the instrument conditions and the like used in the measurement were as follows.

X-ray source: CuKα
Operation axis: 2θ/θ
Measurement method: continuous
Coefficient unit: cps
Starting angle: 10°
Ending angle: 120°
Detector: PSD
Detector Type: VANTEC-1
High Voltage: 5,585 V
Discr. Lower Level: 0.25 V
Discr. Window Width: 0.15 V
Grid Lower Level: 0.075 V
Grid Window Width: 0.524 V
Flood Field Correction: Disabled
Primary radius: 250 mm
Secondary radius: 250 mm
Receiving slit width: 0.1436626 mm
Divergence angle: 0.3°
Filament Length: 12 mm
Sample Length: 25 mm
Receiving Slit Length: 12 mm
Primary Sollers: 2.623°
Secondary Sollers: 2.623°
Lorentzian, 1/Cos: 0.004933548 Th <Measurement of the Moisture Adsorption Rate>

The moisture adsorption rate was measured by the following method. The each powder obtained in the Examples and the Comparative Example was in advance dried at 180° C. for one night.

A sample was taken out from a dryer; and by using a Karl Fischer moisture meter (CA-100 type, manufactured by Mitsubishi Chemical Corp.), there was measured an amount A of moisture released when the sample was heated for 45 min in an apparatus in a nitrogen atmosphere at 170° C.

Similarly, a sample taken out from the dryer was allowed to stand still in a thermostatic chamber at 60° C. and at a humidity of 80% for 10 min. The powder was taken out after the 10 min; and by using a Karl Fischer moisture meter (CA-100 type, manufactured by Mitsubishi Chemical Corp.), there was measured an amount B of moisture released when the sample was heated for 45 min in an apparatus in a nitrogen atmosphere at 170° C.

The amount of moisture (ppm/($m^2$/g)) adsorbed per specific surface area was calculated from the amount of moisture (the amount B of moisture–the amount A of moisture) having increased in 10 min and the SSA value. Then, the amount of moisture having been adsorbed per unit time was calculated and taken as a moisture adsorption rate ((ppm/$m^2$/g)/min).

<Evaluation of Battery Characteristics>

8.0 g of each lithium metal composite oxide powder (sample) obtained in the Examples and the Comparative Example and 1.0 g of an acetylene black (manufactured by Denki Kagaku Kogyo K.K.) were exactly weighed, and mixed in a mortar for 10 min. Thereafter, 8.3 g of a solution in which 12% by weight of a PVDF (manufactured by Kishida Chemical Co., Ltd.) was dissolved in NMP (N-methylpyrrolidone) was exactly weighed; and the mixture of the lithium metal composite oxide powder and the acetylene black was added thereto, and further mixed. Thereafter, 5 ml of NMP was added and fully mixed to thereby fabricate a paste. The paste was put on an aluminum foil being a current collector, and made into a coated film with an applicator whose gap was adjusted to 100 μm to 280 μm, vacuum dried at 140° C. for one day and night, thereafter subjected to roll pressing at a linear pressure of 0.3 t/$cm^2$, and punched out into φ16 mm to thereby make a positive electrode.

Right before the fabrication of a battery, the positive electrode was vacuum dried at 200° C. for 300 min or longer, adhered moisture was removed and the positive electrode was assembled in the battery. The average value of the weight of the aluminum foil of φ16 mm was in advance determined; and the weight of the positive electrode mixture was determined by subtracting the weight of the aluminum foil from the weight of the positive electrode. Further the content of a positive electrode active material was determined from the mixing proportions of the lithium metal composite oxide powder (positive electrode active material), the acetylene black and the PVDF.

The negative electrode used metallic Li of φ19 mm×0.5 mm in thickness; the electrolytic solution used one in which $LiPF_6$ as a solute was dissolved in 1 mol/L in a mixture as a solvent of EC and DMC in 3:7 by volume; and a cell TOMCEL® (R) for electrochemical evaluation shown in FIG. 1 was fabricated.

(Initial Activity)

The electrochemical cell prepared as described above was subjected to an initial activation using a method described in the following. The cell was charged at 25° C. in a 0.1 C constant current/constant potential mode up to 4.3 V, and thereafter discharged in a 0.1 C constant current mode down to 3.0 V. This process was repeated in two cycles. Here, a current value actually set was calculated from the content of the positive electrode active material in the positive electrode.

(High-temperature Charge-discharge Cycle Ability Evaluation: 55° C. High-temperature Cycle Ability)

The electrochemical cell after being subjected to the initial activation as described above was subjected to a charge and discharge test using a method described in the following; and the high-temperature cycle ability.

The cell was put in an environmental testing chamber whose environmental temperature at which the cell is charged and discharged was set at 55° C., and prepared so as to be able to be charged and discharged; the cell was allowed to stand still for 4 hours such that the cell temperature became the environmental temperature; thereafter, with the charge and discharge range being set at 4.3 V to 3.0 V, the first-cycle charge and discharge was carried out in which charge was carried out in a 0.1 C constant current/constant potential mode and discharge was carried out in a 0.1 C constant current mode; and thereafter, the charge and discharge cycle was carried out 40 times at 1 C.

The percentage (%) of a numerical value determined by dividing a discharge capacity of the 40th cycle by a discharge capacity of the second cycle was taken as a high-temperature cycle ability value.

In Table 1, there were shown high-temperature cycle ability values of the Examples and the Comparative Example as relative values with a high-temperature cycle ability value of Comparative Example 1 being taken to be 100.

(Low-Temperature Output Characteristics Evaluation Test: Evaluation of the Resistance at a Low Temperature)

Separately, the electrochemical cell after being subjected to the initial activation was charged at 25° C. in a 0.1 C constant current mode up to an SOC of 50%. After the charge, the cell was allowed to stand still in a thermostatic chamber set at 0° C. for 4 hours or longer. Thereafter, the cell was discharged at a 3 C current value for 10 sec; a potential difference was determined by subtracting a potential after the discharge from a potential after the charge; a resistance value was determined by dividing the potential difference by the 3 C current value; and the resistance value was taken as an index of the resistance at a low temperature. In Table 1, the resistance values were indicated as relative values (%) with a resistance value of Comparative Example 1 being taken to be 100.0%. These indications show that the lower the numerical value, the lower the resistance at a low temperature, that is, the more the low-temperature output characteristics are improved.

TABLE 1

|  |  | Example 1 | Example 2 | Example 3 | Example 4 | Example 5 | Example 6 | Example 7 | Example 8 | Example 9 | Example 10 | Comparative Example 1 |
|---|---|---|---|---|---|---|---|---|---|---|---|---|
| Element Presented More in Surface Portion Than in Particle Inner Portion | | Al | Al | Al | Al | Al | Al | Al | Ti | Zr | Al | None |
| Amount of Surface LiOH | wt % | 0.05 | 0.07 | 0.06 | 0.05 | 0.08 | 0.04 | 0.08 | 0.06 | 0.08 | 0.09 | 0.15 |
| Amount of Surface $Li_2CO_3$ | wt % | 0.15 | 0.13 | 0.13 | 0.13 | 0.17 | 0.12 | 0.13 | 0.19 | 0.18 | 0.14 | 0.47 |
| (003)/(104) Integral Intensity Ratio | — | 1.31 | 1.23 | 1.21 | 1.22 | 1.25 | 1.25 | 1.24 | 1.20 | 1.20 | 1.22 | 1.15 |

TABLE 1-continued

| | | Example 1 | Example 2 | Example 3 | Example 4 | Example 5 | Example 6 | Example 7 | Example 8 | Example 9 | Example 10 | Comparative Example 1 |
|---|---|---|---|---|---|---|---|---|---|---|---|---|
| Amount of S | wt % | 0.01 | 0.02 | 0.02 | 0.02 | 0.02 | 0.01 | 0.04 | 0.01 | 0.01 | 0.02 | 0.30 |
| Tap Density | g/cm$^3$ | 2.1 | 2.1 | 2.1 | 2.3 | 2.2 | 2.3 | 2.2 | 2.1 | 2.3 | 2.1 | 1.9 |
| $C_A/C_M$ (Analysis by XPS) | — | 0.06 | 0.10 | 0.11 | 0.12 | 0.09 | 0.07 | 0.11 | 0.04 | 0.10 | 0.06 | — |
| $C_A/C_{Ni}$ (Analysis by XPS) | — | 0.12 | 0.22 | 0.22 | 0.25 | 0.17 | 0.15 | 0.23 | 0.07 | 0.18 | 0.12 | — |
| $C_A$ | at % | 1.0 | 1.6 | 1.5 | 1.8 | 0.7 | 1.0 | 1.3 | 0.4 | 0.7 | 1.0 | — |
| $C_M$ | at % | 16.9 | 14.2 | 13.4 | 14.9 | 8.0 | 13.0 | 11.8 | 10.9 | 7.2 | 15.5 | — |
| $C_{Ni}$ | at % | 8.5 | 7.3 | 6.9 | 7.2 | 4.0 | 6.5 | 5.9 | 5.8 | 3.8 | 8.2 | — |
| Crystallite Size Ratio of (003) Plane/(110) Plane | — | 2.0 | 2.1 | 2.0 | 2.0 | 2.2 | 1.9 | 1.8 | 1.9 | 2.1 | 2.1 | 2.2 |
| Primary Particle Area/Secondary Particle Area | — | 0.017 | 0.016 | 0.032 | 0.013 | 0.026 | 0.020 | 0.016 | 0.018 | 0.023 | 0.021 | 0.012 |
| Amount of Surface Lithium Impurity | wt % | 0.20 | 0.20 | 0.19 | 0.18 | 0.25 | 0.16 | 0.21 | 0.25 | 0.26 | 0.23 | 0.62 |
| Thickness of Surface Portion | nm | 10 | 14 | 17 | 16 | 13 | 14 | 20 | 9 | 16 | 12 | — |
| D50 | um | 7 | 7 | 8 | 7 | 7 | 7 | 7 | 6 | 7 | 6 | 9 |
| Specific Surface Area | m$^2$/g | 0.8 | 0.5 | 0.5 | 0.4 | 0.6 | 0.7 | 0.6 | 0.9 | 0.8 | 0.7 | 0.5 |
| Na | ppm | 90 | 120 | 110 | 85 | 140 | 70 | 180 | 60 | 60 | 160 | 400 |
| K | ppm | 20 | 25 | 20 | 15 | 40 | 10 | 40 | 20 | 10 | 55 | 70 |
| Moisture Adsorption Rate | (ppm/(m$^2$/g))/min | 43 | 50 | 60 | 55 | 65 | 40 | 68 | 48 | 42 | 69 | 123 |
| Charge and Discharge Efficiency | % | 89 | 88 | 88 | 87 | 88 | 88 | 87 | 89 | 89 | 87 | 86 |
| Charge-Discharge Cycle Ability: 4.3 V Capacity Retention Rate | % | 122 | 124 | 127 | 128 | 120 | 123 | 125 | 120 | 121 | 124 | 100 |
| Low-Temperature Output Characteristics: Low-Temperature Resistance Index | % | 89 | 93 | 93 | 75 | 95 | 68 | 90 | 96 | 94 | 93 | 100 |

CONSIDERATION

From the Examples and Comparative Example and results of tests carried out by the inventor, it was found that when a lithium metal composite oxide powder is one comprising a particle having the surface portion where one or a combination of two or more of the group consisting of Al, Ti and Zr is present on a surface of the particle comprising the lithium metal composite oxide having a layered crystal structure, in the case of use as a positive electrode active material for a lithium secondary battery, the reaction with an electrolytic solution can be suppressed and the charge-discharge cycle ability can be improved.

Then at this time, it was found that when the ratio (003)/(104) of an integral intensity of the peak originated from the (003) plane to an integral intensity of the peak originated from the (104) plane is higher than 1.15, the proportion taken by the rock salt structure is low and the charge and discharge efficiency can be made good.

It was also been found that in the lithium metal composite oxide powder, when the amount of the surface LiOH is smaller than 0.10% by weight; the amount of the surface Li$_2$CO$_3$ is smaller than 0.25% by weight; and the amount of S is smaller than 0.10% by weight of the lithium metal composite oxide powder (100% by weight), since impurities and alkali components, which become resistance components, present on the particle surface are reduced, the low-temperature output characteristics can be made good.

Further, it was found that when the ratio ($C_A/C_M$) of a concentration (at %) (in the case where the surface element A contains two or more elements, the total concentration) of the surface element A to a concentration (at %) (in the case where the constituent element M contains two or more elements, the total concentration) of the constituent element M is higher than 0 and lower than 0.8, as measured by XPS, the reaction with an electrolytic solution can be suppressed and the charge-discharge cycle ability can be improved; and the low-temperature output characteristics can be made equal to or more than that of conventionally proposed surface-treated positive electrode active materials.

Although the above Examples are Examples of the lithium metal composite oxides having a layered crystal structure having a specific composition, from the results of the tests carried out by the present inventor and the technical common sense, since lithium metal composite oxides having a layered crystal structure have common problems, and the influences by the surface treatment and the heat treatment are similar, it can be considered that the lithium metal composite oxides having a layered crystal structure can attain the same common effect irrespective of their compositions.

It can be considered that since particularly a material having, as a core material, a particle comprising the lithium metal composite oxide having a layered crystal structure and represented by the general formula: Li$_{1+x}$M$_{1-x}$O$_2$ (wherein M is one or a combination of two or more (these are referred to as "constituent element M") of the group consisting of Mn, Co, Ni, transition elements of from the third group elements to the 11th group elements of the periodic table, and typical elements up to the third period of the periodic table) has the common problems and properties, the same effect can be attained.

The invention claimed is:

1. A lithium metal composite oxide powder, comprising a particle having a surface portion where one or a combination of two or more (referred to as "surface element A") of the group consisting of Al, Ti and Zr is present, on a surface of a particle comprising a lithium metal composite oxide having a layered crystal structure, wherein an amount of surface LiOH measured by the following measuring method is smaller than 0.10% by weight of the lithium metal composite oxide powder, and an amount of surface $Li_2CO_3$ measured by the following measuring method is smaller than 0.25% by weight of the lithium metal composite oxide powder;

in an X-ray diffraction pattern obtained by X-ray diffraction using CuKα radiation, a ratio of an integral intensity of the (003) plane of the lithium metal composite oxide to that of the (104) plane thereof is higher than 1.15; and an amount of S obtained by a measurement using an inductively coupled plasma (ICP) atomic emission spectrometer is smaller than 0.10% by weight of the lithium metal composite oxide powder (100% by weight), wherein the amount of surface LiOH and the amount of surface $Li_2CO_3$ are measured by a titration that is carried out according to the following procedure by reference to a Winkler method, wherein 10.0 g of a sample is dispersed in 50 ml of ion-exchanged water, immersed therein for 15 min, and thereafter filtered; and the filtrate is titrated with hydrochloric acid; and at this time, by using phenolphthalein and bromophenol blue as indicators, the amount of the surface LiOH and the amount of the surface $Li_2CO_3$ are calculated based on the discoloration of the filtrate and an amount of titration at this time, the lithium metal composite oxide is a lithium metal composite oxide represented by the general formula: $Li_{1+x}M_{1-x}O_2$, wherein x=0 to 0.07 and M is one or a combination of two or more (referred to as "constituent element M") of the group consisting of Mn, Co, Ni, transition elements in the third group elements through and including the 11th group elements of the periodic table, and elements in the first period through and including the third period of the periodic table, and a ratio ($C_A/C_M$) of a concentration (at %) referred to as "$C_A$"; in the case where the surface element A contains two or more elements, the total concentration of the surface element A to a concentration (at %) referred to as "$C_M$"; in the case where the constituent element M contains two or more elements, the total concentration of the constituent element M is higher than 0 and lower than 0.8, as measured by X-ray photoelectron spectroscopy (XPS).

2. The lithium metal composite oxide powder according to claim 1, wherein a tap density (TD) thereof is higher than 2.0 g/cm$^3$.

3. A lithium metal composite oxide powder comprising a particle having a surface portion where one or a combination of two or more (referred to as "surface element A") of the group consisting of Al, Ti and Zr is present, on a surface of a particle comprising a lithium metal composite oxide having a layered crystal structure, wherein an amount of surface LiOH measured by the following measuring method is smaller than 0.10% by weight of the lithium metal composite oxide powder, and an amount of surface $Li_2CO_3$ measured by the following measuring method is smaller than 0.25% by weight of the lithium metal composite oxide powder;

in an X-ray diffraction pattern obtained by X-ray diffraction using CuKα radiation, a ratio of an integral intensity of the (003) plane of the lithium metal composite oxide to that of the (104) plane thereof is higher than 1.15; and an amount of S obtained by a measurement using an inductively coupled plasma (ICP) atomic emission spectrometer is smaller than 0.10% by weight of the lithium metal composite oxide powder (100% by weight), wherein the amount of surface LiOH and the amount of surface $Li_2CO_3$ are measured by a titration that is carried out according to the following procedure by reference to a Winkler method, wherein 10.0 g of a sample is dispersed in 50 ml of ion-exchanged water, immersed therein for 15 min, and thereafter filtered; and the filtrate is titrated with hydrochloric acid; and at this time, by using phenolphthalein and bromophenol blue as indicators, the amount of the surface LiOH and the amount of the surface $Li_2CO_3$ are calculated based on the discoloration of the filtrate and an amount of titration at this time, the lithium metal composite oxide is a lithium metal composite oxide represented by the general formula: $Li_{1+x}M_{1-x}O_2$, wherein x=0 to 0.07 and M is one or a combination of two or more (referred to as "constituent element M") of the group consisting of Mn, Co, Ni, transition elements in the third group elements through and including the 11th group elements of the periodic table, and elements in the first period through and including the third period of the periodic table, and a ratio ($C_A/C_{Ni}$) of a concentration (at %) (referred to as "$C_A$"; in the case where the surface element A contains two or more elements, the total concentration) of the surface element A to a concentration (at %) (referred to as "$C_{Ni}$") of a constituent element Ni is higher than 0 and lower than 1.0, as measured by X-ray photoelectron spectroscopy (XPS).

4. A lithium metal composite oxide powder comprising a particle having a surface portion where one or a combination of two or more (referred to as "surface element A") of the group consisting of Al, Ti and Zr is present, on a surface of a particle comprising a lithium metal composite oxide having a layered crystal structure, wherein an amount of surface LiOH measured by the following measuring method is smaller than 0.10% by weight of the lithium metal composite oxide powder, and an amount of surface $Li_2CO_3$ measured by the following measuring method is smaller than 0.25% by weight of the lithium metal composite oxide powder;

in an X-ray diffraction pattern obtained by X-ray diffraction using CuKα radiation, a ratio of an integral intensity of the (003) plane of the lithium metal composite oxide to that of the (104) plane thereof is higher than 1.15; and an amount of S obtained by a measurement using an inductively coupled plasma (ICP) atomic emission spectrometer is smaller than 0.10% by weight of the lithium metal composite oxide powder (100% by weight), wherein the amount of surface LiOH and the amount of surface $Li_2CO_3$ are measured by a titration that is carried out according to the following procedure by reference to a Winkler method, wherein 10.0 g of a sample is dispersed in 50 ml of ion-exchanged water, immersed therein for 15 min, and thereafter filtered; and the filtrate is titrated with hydrochloric acid; and at this time, by using phenolphthalein and bromophenol blue as indicators, the amount of the surface LiOH and the amount of the surface $Li_2CO_3$ are calculated based on the discoloration of the filtrate and an amount of titration at this time, the lithium metal composite oxide is a lithium metal composite oxide represented by the general formula: $Li_{1+x}M_{1-x}O_2$, wherein x=0 to 0.07 and M is one or a combination of two or more (referred to as "constituent element M") of the group consisting of Mn, Co, Ni, transition elements in the third group elements through and including the 11th group elements of the periodic table, and elements in the first period through and including the third period of the periodic table, and a concentration (at %) (referred to as "$C_M$"; in the case where the constituent element M contains two or more elements, the total concentration) of the constituent element M is higher than 0 at % and lower than 50 at %; a concentration (at %) (referred to as "$C_A$"; in the case where the surface element A contains two or more elements, the total concentration) of the surface element A is higher than 0 at % and lower than 10 at %; and a concentration (at %) (referred to as "$C_{Ni}$") of a constituent element Ni is higher than 0 at % and lower than 25 at %, as measured by X-ray photoelectron spectroscopy (XPS).

5. The lithium metal composite oxide powder according to claim 1, wherein a ratio of a crystallite size of the (003) plane of the lithium metal composite oxide to that of the (110) plane thereof is higher than 1.0 and lower than 2.5, as calculated by Scherrer's equation using an X-ray diffraction pattern obtained by X-ray diffraction using CuKα1 radiation.

6. The lithium metal composite oxide powder according to claim 1, wherein a ratio (referred to as "primary particle area/secondary particle area") of a primary particle area determined by the following measuring method to a secondary particle area determined by the following measuring method from secondary particles having a size corresponding to D50 (referred to as "D50") according to a volume-based particle size distribution obtained by a measurement by a laser diffraction scattering-type particle size distribution measuring method is 0.004 to 0.035, wherein the method of measuring the secondary particle area comprises that the lithium metal composite oxide powder is observed by an electron microscope; 5 secondary particles having a size corresponding to D50 are randomly selected; in the case where the secondary particles are spherical, lengths of the particles are taken as diameters (μm) and areas are calculated; in the case where the secondary particles are in indeterminate shapes, areas are calculated by spherical approximation; and an average value of the 5 areas are determined as a secondary particle area (μm$^2$); and wherein the method of measuring the primary particle area comprises that the lithium metal composite oxide powder is observed by an electron microscope; 5 secondary particles having a size corresponding to D50 are randomly selected; 100 primary particles are randomly selected from the selected 5 secondary particles; an average particle diameter of the primary particles is determined using image analysis software, and is taken as a diameter (μm); and an area is calculated by spherical approximation and is determined as a primary particle area (μm$^2$).

7. The lithium metal composite oxide powder according to claim 1, wherein an amount of surface lithium is smaller than 0.35% by weight.

8. The lithium metal composite oxide powder according to claim 3, wherein a ratio of a crystallite size of the (003) plane of the lithium metal composite oxide to that of the (110) plane thereof is higher than 1.0 and lower than 2.5, as calculated by Scherrer's equation using an X-ray diffraction pattern obtained by X-ray diffraction using CuKα1 radiation.

9. The lithium metal composite oxide powder according to claim 4, wherein a ratio of a crystallite size of the (003) plane of the lithium metal composite oxide to that of the (110) plane thereof is higher than 1.0 and lower than 2.5, as calculated by Scherrer's equation using an X-ray diffraction pattern obtained by X-ray diffraction using CuKα1 radiation.

10. The lithium metal composite oxide powder according to claim 3, wherein a ratio (referred to as "primary particle area/secondary particle area") of a primary particle area determined by the following measuring method to a secondary particle area determined by the following measuring method from secondary particles having a size corresponding to D50 (referred to as "D50") according to a volume-based particle size distribution obtained by a measurement by a laser diffraction scattering-type particle size distribution measuring method is 0.004 to 0.035, wherein the method of measuring the secondary particle area comprises that the lithium metal composite oxide powder is observed by an electron microscope; 5 secondary particles having a size corresponding to D50 are randomly selected; in the case where the secondary particles are spherical, lengths of the particles are taken as diameters (μm) and areas are calculated; in the case where the secondary particles are in indeterminate shapes, areas are calculated by spherical approximation; and an average value of the 5 areas are determined as a secondary particle area (μm$^2$); and wherein the method of measuring the primary particle area comprises that the lithium metal composite oxide powder is observed by an electron microscope; 5 secondary particles having a size corresponding to D50 are randomly selected; 100 primary particles are randomly selected from the selected 5 secondary particles; an average particle diameter of the primary particles is determined using image analysis software, and is taken as a diameter (μm); and an area is calculated by spherical approximation and is determined as a primary particle area (μm$^2$).

11. The lithium metal composite oxide powder according to claim 4, wherein a ratio (referred to as "primary particle area/secondary particle area") of a primary particle area determined by the following measuring method to a secondary particle area determined by the following measuring method from secondary particles having a size corresponding to D50 (referred to as "D50") according to a volume-based particle size distribution obtained by a measurement by a laser diffraction scattering-type particle size distribution measuring method is 0.004 to 0.035, wherein the method of measuring the secondary particle area comprises that the lithium metal composite oxide powder is observed by an electron microscope; 5 secondary particles having a size corresponding to D50 are randomly selected; in the case where the secondary particles are spherical, lengths of the particles are taken as diameters (μm) and areas are calculated; in the case where the secondary particles are in indeterminate shapes, areas are calculated by spherical approximation; and an average value of the 5 areas are determined as a secondary particle area ($\mu m^2$); and wherein the method of measuring the primary particle area comprises that the lithium metal composite oxide powder is observed by an electron microscope; 5 secondary particles having a size corresponding to D50 are randomly selected; 100 primary particles are randomly selected from the selected 5 secondary particles; an average particle diameter of the primary particles is determined using image analysis software, and is taken as a diameter (μm); and an area is calculated by spherical approximation and is determined as a primary particle area ($\mu m^2$).

12. The lithium metal composite oxide powder according to claim 3, wherein an amount of surface lithium is smaller than 0.35% by weight.

13. The lithium metal composite oxide powder according to claim 4, wherein an amount of surface lithium is smaller than 0.35% by weight.

14. The lithium metal composite oxide powder according to claim 3, wherein a tap density (TD) thereof is higher than 2.0 g/cm$^3$.

15. The lithium metal composite oxide powder according to claim 4, wherein a tap density (TD) thereof is higher than 2.0 g/cm$^3$.

* * * * *

UNITED STATES PATENT AND TRADEMARK OFFICE
CERTIFICATE OF CORRECTION

PATENT NO. : 10,312,508 B2
APPLICATION NO. : 15/508184
DATED : June 4, 2019
INVENTOR(S) : Tetsuya Mitsumoto et al.

It is certified that error appears in the above-identified patent and that said Letters Patent is hereby corrected as shown below:

In the Claims

Column 36, Line 30, Claim 3, delete "$(C_A/C_{Ni,})$" and insert -- $(C_A/C_{Ni})$ --

Column 36, Line 34, Claim 3, delete ""$C_{Ni,}$")" and insert -- "$C_{Ni}$") --

Column 37, Line 22, Claim 4, delete ""$C_{Ni,}$")" and insert -- "$C_{Ni}$") --

Column 38, Line 27, Claim 10, delete "is0.004" and insert -- is 0.004 --

Signed and Sealed this
Twenty-seventh Day of August, 2019

Andrei Iancu
*Director of the United States Patent and Trademark Office*